United States Patent
Adachi et al.

(10) Patent No.: US 7,819,420 B2
(45) Date of Patent: Oct. 26, 2010

(54) KNEE-PROTECTING AIRBAG APPARATUS

(75) Inventors: Yuichi Adachi, Nishikasugai-gun (JP); Kazuaki Bito, Nishikasugai-gun (JP); Osamu Fukawatase, Nishikamo-gun (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 10 days.

(21) Appl. No.: 12/312,771

(22) PCT Filed: Jan. 9, 2008

(86) PCT No.: PCT/JP2008/050470
§ 371 (c)(1),
(2), (4) Date: May 27, 2009

(87) PCT Pub. No.: WO2008/087993
PCT Pub. Date: Jul. 24, 2008

(65) Prior Publication Data
US 2010/0007120 A1   Jan. 14, 2010

(30) Foreign Application Priority Data
Jan. 15, 2007 (JP) ............................. 2007-006212

(51) Int. Cl.
*B60R 21/16* (2006.01)
(52) U.S. Cl. ................................. 280/730.1; 280/743.1
(58) Field of Classification Search .............. 280/730.2, 280/743.1, 752
See application file for complete search history.

(56) References Cited

U.S. PATENT DOCUMENTS

| 5,570,901 A | 11/1996 | Fyrainer |
| 7,481,455 B2* | 1/2009 | Iida et al. ................. 280/743.1 |
| 2006/0055157 A1* | 3/2006 | Ishiguro et al. ............. 280/731 |

FOREIGN PATENT DOCUMENTS

| EP | 1 300 299 A1 | 4/2003 |
| EP | 1 452 407 A1 | 9/2004 |
| EP | 1 844 992 A2 | 10/2007 |
| JP | A-08-301054 | 11/1996 |
| JP | A-09-104317 | 4/1997 |
| JP | A-2002-037003 | 2/2002 |
| JP | A-2003-170801 | 6/2003 |
| JP | B2-3752920 | 12/2005 |
| JP | B2-3760424 | 1/2006 |

* cited by examiner

*Primary Examiner*—Faye M. Fleming
(74) *Attorney, Agent, or Firm*—Oliff & Berridge, PLC

(57) ABSTRACT

The knee-protecting airbag apparatus is mounted on a lower region of a column cover covering a steering column of vehicle projecting rearward from an instrument panel. The airbag (47) folded and housed in a housing emerges and spreads in four directions from the housing for deployment in front of knees of a driver when fed with inflation gas from an inflator (41) that is stored inside the airbag (47) and disposed to the rear side of the housing. Folding of the airbag (47) before being stored in the housing is such that left and right areas of a region (50) attached to the housing is folded on the side of the column side wall (49) to reduce the lateral width L2 of the airbag (47) without superimposing the left and right areas of the mounting region (50) on the inflator (41) in the vertical direction and a folded region (63) on the front side of the mounting region (50) is located in parallel with and in front of the inflator (41).

9 Claims, 16 Drawing Sheets

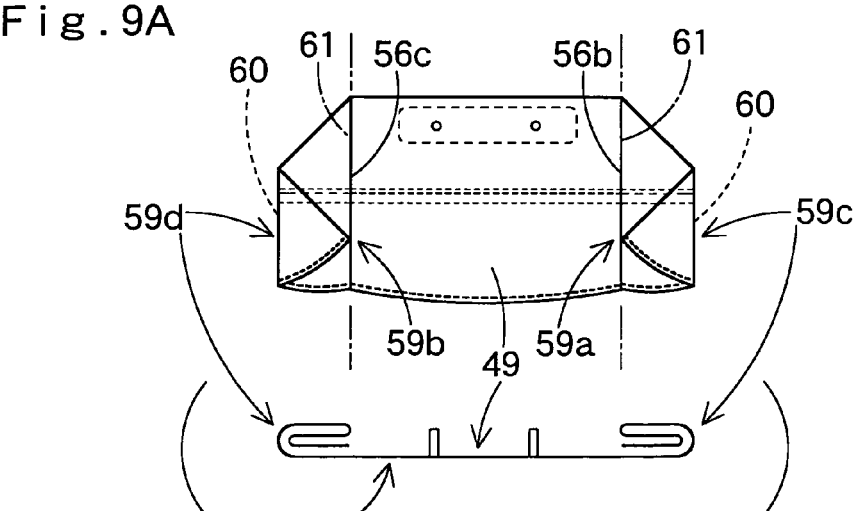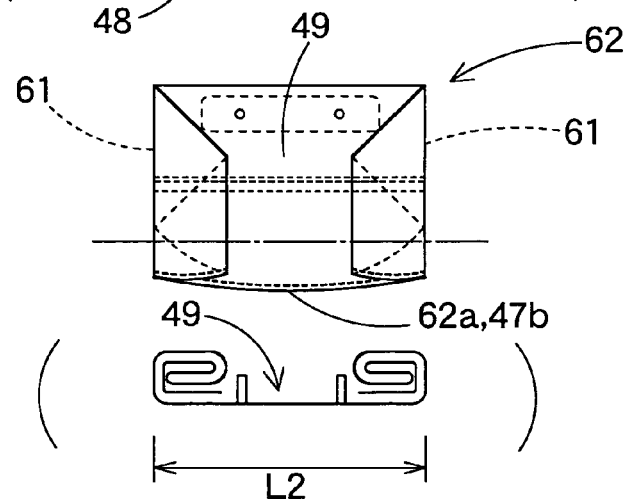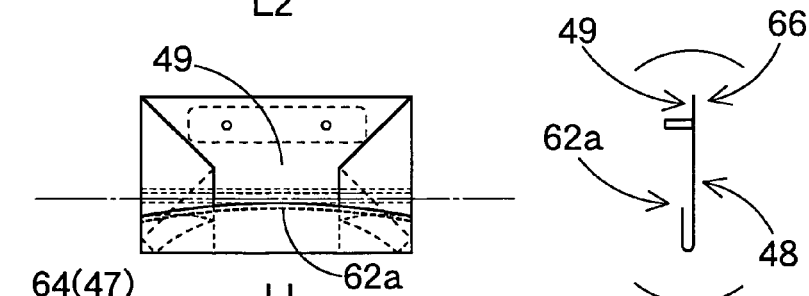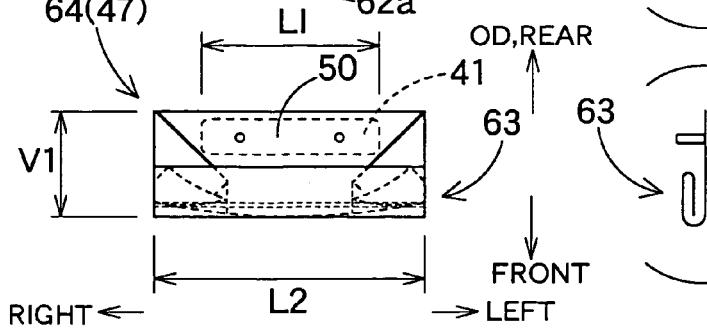

KNEE-PROTECTING AIRBAG APPARATUS

TECHNICAL FIELD

The present invention relates to a knee-protecting airbag apparatus which protects knees of a driver upon a crash of vehicle with an airbag, and more particularly to a knee-protecting airbag apparatus mounted on a steering column such that the airbag is housed in a folded state inside a column cover that covers the steering column projecting rearward from an instrument panel.

BACKGROUND OF THE INVENTION

A knee-protecting airbag apparatus mounted on a steering column is known from JP 2002-37003. An airbag of this airbag apparatus is housed at a lower region of a space inside a column cover in a folded state. In operation, the airbag is fed with inflation gas and emerges from the column cover to be deployed in front of knees of a driver.

More specifically, when an inflator located inside the airbag discharges inflation gas obliquely downward to the left and right, the airbag unfolds and inflates radially from a substantial center of the column cover, and protects knees of a driver from the column cover in such a manner as to open up the knees. The inflator is secured to a column tube of the steering column while securing a region of the airbag attached to an airbag housing together to the column tube.

DISCLOSURE OF THE INVENTION

In an instance where the steering column is equipped with a telescopic mechanism, tilt mechanism for adjusting the disposition of the steering wheel, and/or signal wires for a cruise control system, a limited space is allowed inside the column cover for storage of the knee-protecting airbag apparatus. Therefore, the airbag apparatus desirably has a compact configuration.

For a stable deployment of the airbag, the mounting region of the airbag, at which the airbag is attached to the housing, is preferably located at the vicinity of the center in both lateral and anteroposterior directions of the airbag at full inflation. Furthermore, in order to protect both knees of a driver securely, it is desired that the airbag is inflated into such a rectangular plate shape as has a greater anteroposterior width than the airbag housing and has such a lateral dimension greater than the anteroposterior width and greater than the lateral width of the lower surface of the column cover as to extend over the column cover and is supported by the rear surface of the instrument panel.

The airbag is folded and housed in the housing together with the inflator for fastening the mounting region of the airbag to the housing, which makes it inevitable that a part of the airbag is disposed below the inflator and the part of the airbag projects downward toward the driver when unfolding and inflating. Moreover, if the airbag is designed to inflate into a generally rectangular plate shape spreading toward four directions from the mounting region to the housing as described above, the airbag part disposed below the inflator is increased, so that the airbag is even more likely to project toward the driver when unfolding and inflating. This is not preferable for a knee-protecting airbag apparatus mounted proximate driver's knees.

The object of the present invention is to provide a knee-protecting airbag apparatus inhibiting the protrusion of an airbag toward a driver upon deployment and being compact in size.

The knee-protecting airbag apparatus of the invention is adapted to be mounted on a lower region of a column cover that covers a steering column of vehicle projecting rearward from an instrument panel. The airbag apparatus includes an airbag folded up by a specific folding method and housed in a housing on a lower area inside the column cover and emerging from the column cover and spreading in four directions from the housing for deployment in front of knees of a driver when fed with inflation gas. The airbag is a non-three-dimensional airbag comprised of a column side wall and a driver side wall having identical generally rectangular outer contours elongative in the lateral direction and is adapted to inflate into a generally rectangular plate shape elongative in the lateral direction. The airbag includes a mounting region on a center in the lateral and anteroposterior directions of the column side wall, at which mounting region the airbag is attached to the housing. The airbag apparatus further includes an inflator stored inside the airbag for supplying inflation gas to the airbag and for attaching the airbag to the housing. The inflator includes a cylindrical body that is provided with gas discharge ports for discharging the inflation gas and is arranged such that its axial direction extends along the lateral direction; and a means to mount the body and the airbag on the housing at the location of the mounting region of the airbag. The inflator is disposed to either one direction in the anteroposterior direction inside the housing.

The folding method of the airbag includes, assuming that said one direction to which the inflator is disposed inside the housing is a one-sided direction, an initial folding that folds an area of the airbag flattened with the column side wall and driver side wall overlaid one on the other to the one-sided direction relative to the mounting region so that the area overlaps and is proximate the mounting region, thereby reducing the anteroposterior width of the airbag;

a bending that bends left and right peripheral areas of the airbag subjected to the initial folding toward an opposite direction from the one-sided direction on creases that extend toward the opposite direction from the one-sided direction in an expanding manner from left and right vicinities of the mounting region in an edge of the airbag subjected to the initial folding in the one-sided direction such that left and right parts of the edge of the airbag subjected to the initial folding in the one-sided direction which are disposed on the left and right of the mounting region are located on extensions from the left and right of the mounting region to the opposite direction from the one-sided direction without overlapping the left and right peripheral areas of the airbag subjected to the initial folding with the mounting region in the vertical direction;

a lateral contraction that folds and brings left and right ends of the airbag subjected to the bending close to the lateral center of the airbag but below or above the inflator so that the airbag is contracted in the lateral direction to fit into the housing; and an anteroposterior contraction that folds and brings an area of the airbag subjected to the lateral contraction on the opposite side from the one-sided direction close to the mounting region and locate a folded region thus formed in parallel with the inflator so that the airbag is contracted in the anteroposterior direction to fit into the housing.

In the knee-protecting airbag apparatus of the present invention, the majority of areas of the airbag except areas of the column side wall and driver side wall that range from the mounting region to the edge on the one-sided direction and over the lateral width of the mounting region is disposed to the opposite side from the one-sided direction relative to the mounting region by the bending. The areas disposed to the opposite side from the one-sided direction is then subjected to the lateral contraction to reduce the lateral width to fit in the housing, and further subjected to the anteroposterior contraction to reduce the anteroposterior width to fit in the housing.

With this way of folding, it is only the areas described above—the areas of the column side wall and driver side wall that range from the mounting region to the edge on the one-sided direction and over the lateral width of the mounting region—that overlaps with the inflator in the direction orthogonal to the axial direction of the steering column, i.e., below the inflator. Accordingly, the thickness of the inflator and the areas of the airbag overlapping with the inflator below the inflator is reduced. Remaining areas of the airbag except the areas overlapping with the inflator are all subjected to the anteroposterior contraction and disposed in parallel with the inflator which is arranged laterally, on the side opposite from the one-sided direction. Therefore, the folded-up airbag is compact in the anteroposterior width and thickness, and the lateral width is generally the same with the lateral width of the mounting region and the inflator.

Consequently, the anteroposterior width, the lateral width, and the thickness (or vertical dimension) of the folded-up airbag and the inflator are compact, thereby downsizing the housing as well.

The area overlapping with the inflator in the direction orthogonal to the axial direction of the steering column, i.e. below the inflator is a small area of the column side wall and driver side wall that ranges from the mounting region to the edge of the airbag in the one-sided direction and over the lateral width of the mounting region. Accordingly, when the airbag is fed with inflation gas discharged from the inflator, the overlapped area projects less toward a driver.

Therefore, the knee-protecting airbag apparatus of the invention inhibits the projection of the airbag toward a driver at deployment, and is compact in size.

The anteroposterior contraction is desirably comprised of roll-folding of a region of the airbag subjected to the lateral contraction including the edge on the opposite side from the one-sided direction toward the mounting region and locating the region thus rolled in parallel with the inflator.

Upon deployment, the airbag unfolds in a generally inverse fashion to the folding steps, and the roll-folding requires more time to unroll or unfold in comparison with other folding methods like bellows-folding. Accordingly, if the anteroposterior contraction is comprised of roll-folding, the unrolling of the rolled region proceeds accompanied by unfolding of the lateral contraction. That is, before completion of unrolling of the roll-folded region, the airbag expands to the left and right quickly by unfolding of the lateral contraction and, and even a part of the area subjected to the bending unfolds toward the left and right.

Then the airbag is fully expanded toward the left and right and the area on the opposite side from the one-sided direction is fully unrolled. The folds formed in the bending are unfolded as well and the area to the one-sided direction relative to the mounting region is unfolded toward the one-sided direction, and then the whole airbag inflates to the full and increase its thickness.

That is, the airbag inflates and thickens after being fully developed toward the left and right without projecting toward a driver. Accordingly, the airbag is preferably used for a knee-protecting airbag apparatus mounted on the steering column proximate a driver.

If the anteroposterior contraction which fold the majority of areas of the airbag is conducted on the side of the column side wall, the unrolling toward the opposite direction to the one-sided direction proceed without projection toward the driver, and thereby accelerating the unfolding toward the left and right.

The above arrangement further enables the airbag to inflate and thicken after being fully developed toward the left and right without projecting toward a driver. Accordingly, the airbag is further preferably used for a knee-protecting airbag apparatus mounted on the steering column proximate a driver. In other words, the airbag apparatus equipped with the above airbag, though it is mounted on the column cover or proximate a driver, deploys the airbag over a region ranging from the lower side of the column cover to a rear surface of the instrument panel on the left and right of the column cover in such a sufficiently thickened state as to exert cushioning property.

Moreover, if the folding of the left and right ends of the airbag subjected to the bending in the lateral contraction is conducted on the side of the column side wall, the projection of the airbag toward a driver is further inhibited at the unfolding of the lateral contraction.

Furthermore, if the bending of the left and right peripheral areas of the airbag subjected to the initial folding toward the opposite direction from the one-sided direction is conducted on the side of the column side wall, the projection of the airbag toward a driver is further inhibited at the undoing of the bending.

In addition, if the initial folding is done by folding of an area of the airbag including the edge in the one-sided direction inward of the airbag, the projection of the airbag toward a driver is further inhibited at the unfolding of the initial folding in comparison with an instance where the area is folded back on the driver side wall. It will be unacceptable to fold the area to the one-sided direction relative to the mounting region on the side of the column side wall because that way the area is likely to be clamped between the mounting region and the airbag housing and thereby inhibiting unfolding of the initial folding upon airbag deployment.

The one-sided direction to which the inflator is disposed inside the housing is desirably the rear side. That is, the inflator is disposed to the rear side of the housing whereas the rolled region of the airbag is to the front side of the housing. This configuration will be advantageous in such an instance where the steering column is configured axially shrinkable for absorbing impact energy by moving the housing disposed proximate the steering wheel forward. Specifically, if the housing is moved forward so the steering column absorbs the impact energy and the housing engages such fixed members located on an immovable area of the steering column as a telescopic mechanism or tilt mechanism, such members will engage only a circumferential wall of the housing, not the rigid inflator, which will not inhibit the impact energy absorption of the steering column.

It will also be appreciated that the airbag includes at front and rear of the mounting region a front tether and a rear tether each having a band shape and joining the column side wall and driver side wall for regulating the thickness of the airbag at inflation and for redirecting inflation gas discharged from the inflator to the left and right. Upon deployment of the airbag, the tethers help accelerate the unfolding of the airbag toward the left and right before the airbag increases in thickness, and therefore, the airbag is preferably used for a knee-protecting airbag apparatus mounted on the steering column proximate a driver.

In the instance where the airbag is provided with the front tether and rear tether, a distance between joints of the front tether and rear tether to the column side wall is greater than a distance between joints of the front tether and rear tether to the driver side wall. With this structure, the inflator used to attach the mounting region of the airbag to the housing is easily accommodated in a space between the joints of the front tether and rear tether to the column side wall.

BRIEF DESCRIPTIONS OF THE DRAWINGS

FIGS. 8A, 8B, 8C, 9A, 9B, 9C and 9D illustrate the folding process of the airbag of FIG. 6 in order;

BEST MODES FOR CARRYING OUT THE INVENTION

Embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
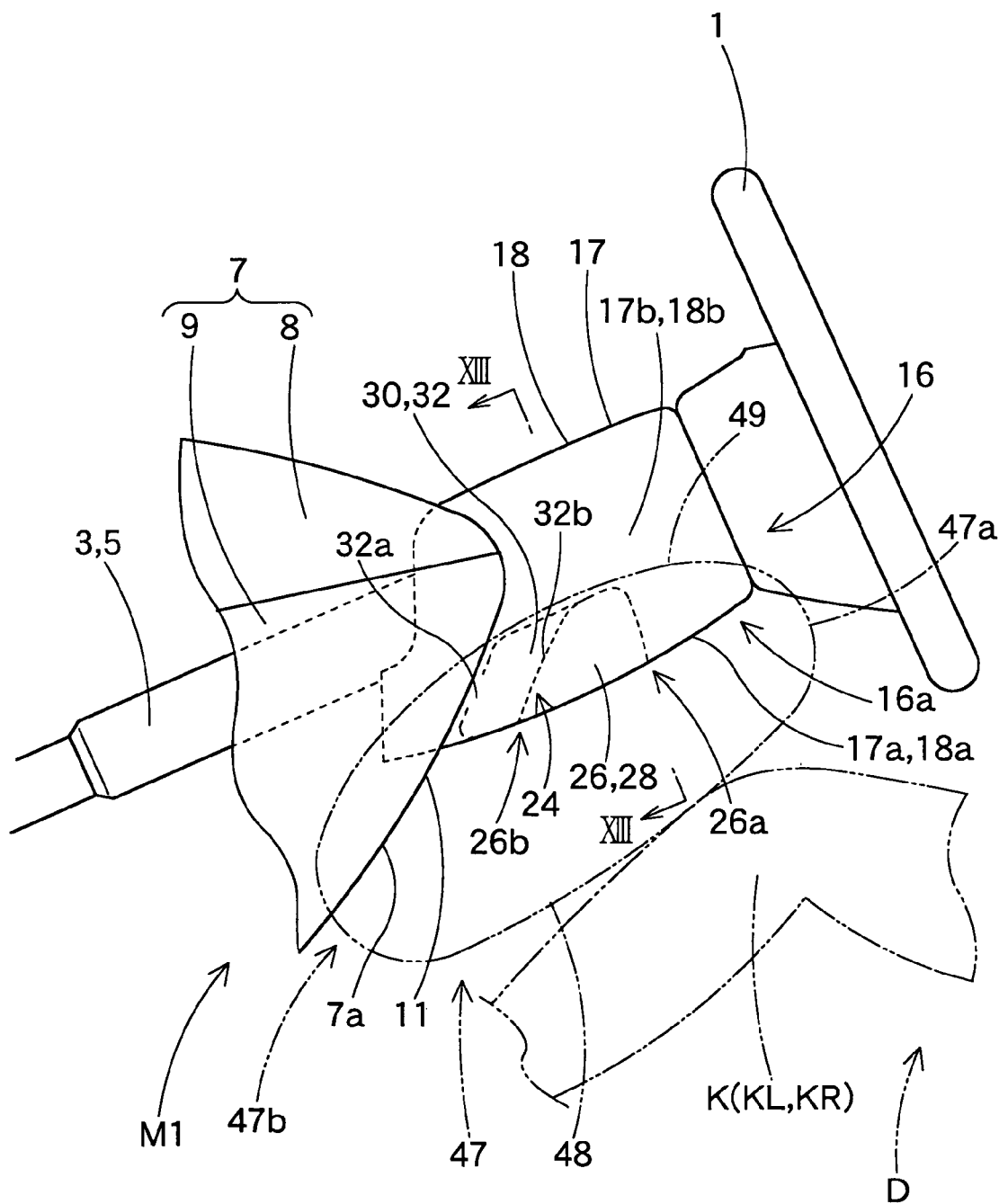
FIG. 1 is a schematic side view of the vicinity of a column cover equipped with a knee-protecting airbag apparatus of the first embodiment of the present invention.
Figure 2:
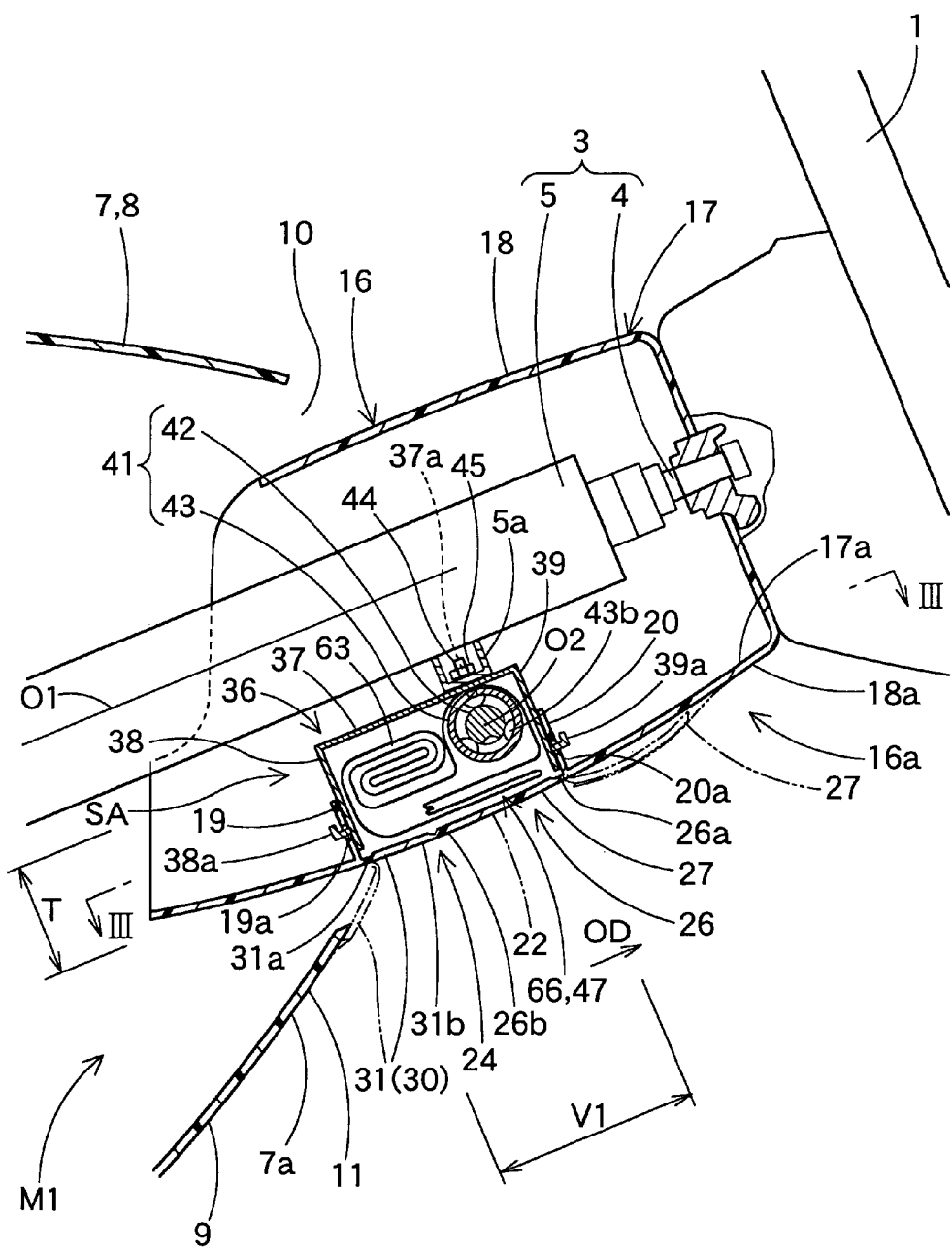
FIG. 2 is a schematic enlarged vertical section of the vicinity of the column cover of FIG. 1 with the airbag apparatus.
Figure 3:
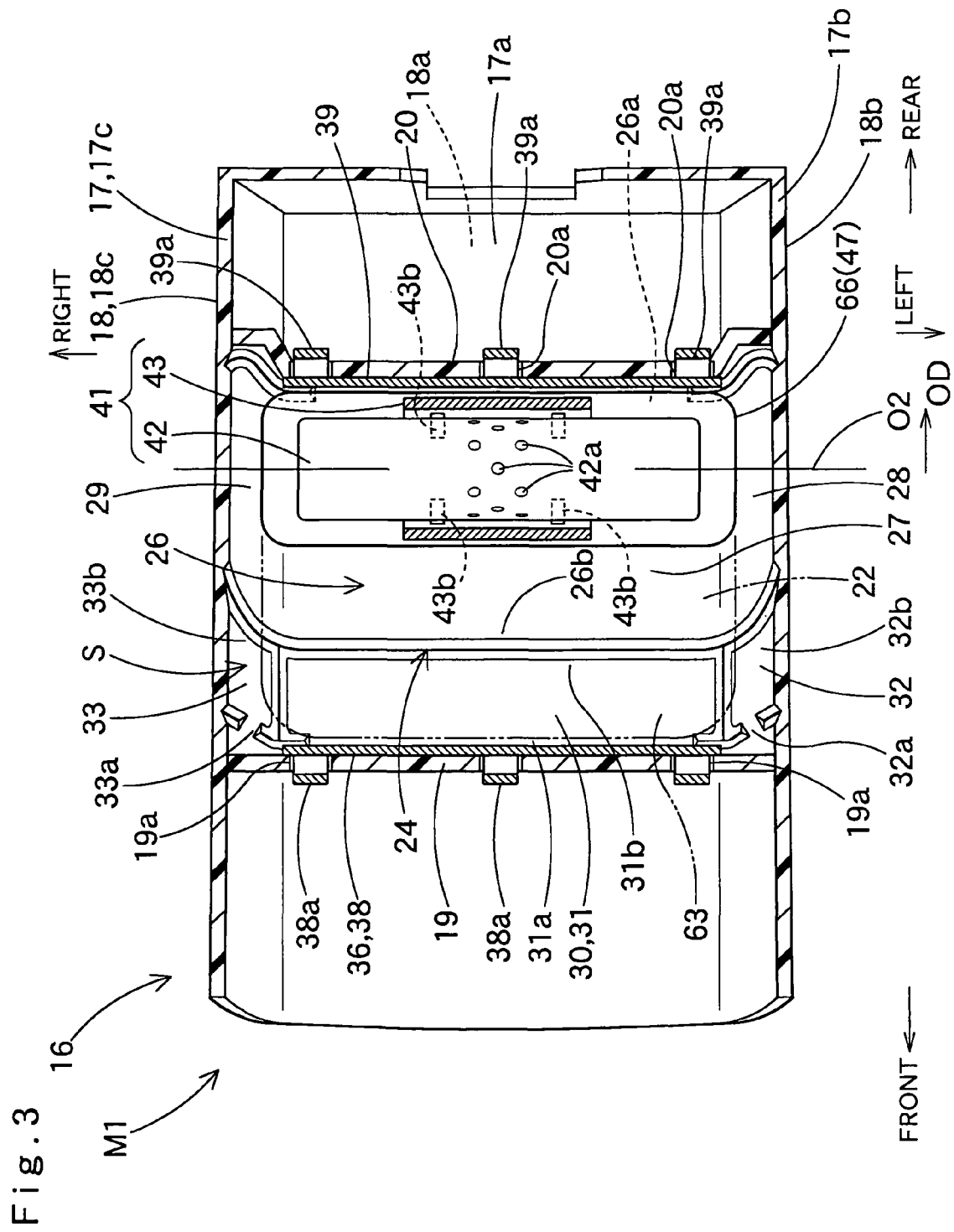
FIG. 3 is a schematic enlarged cross section of the column cover of FIG. 1 equipped with the airbag apparatus taken along line III-III of FIG. 2.
Figure 4:
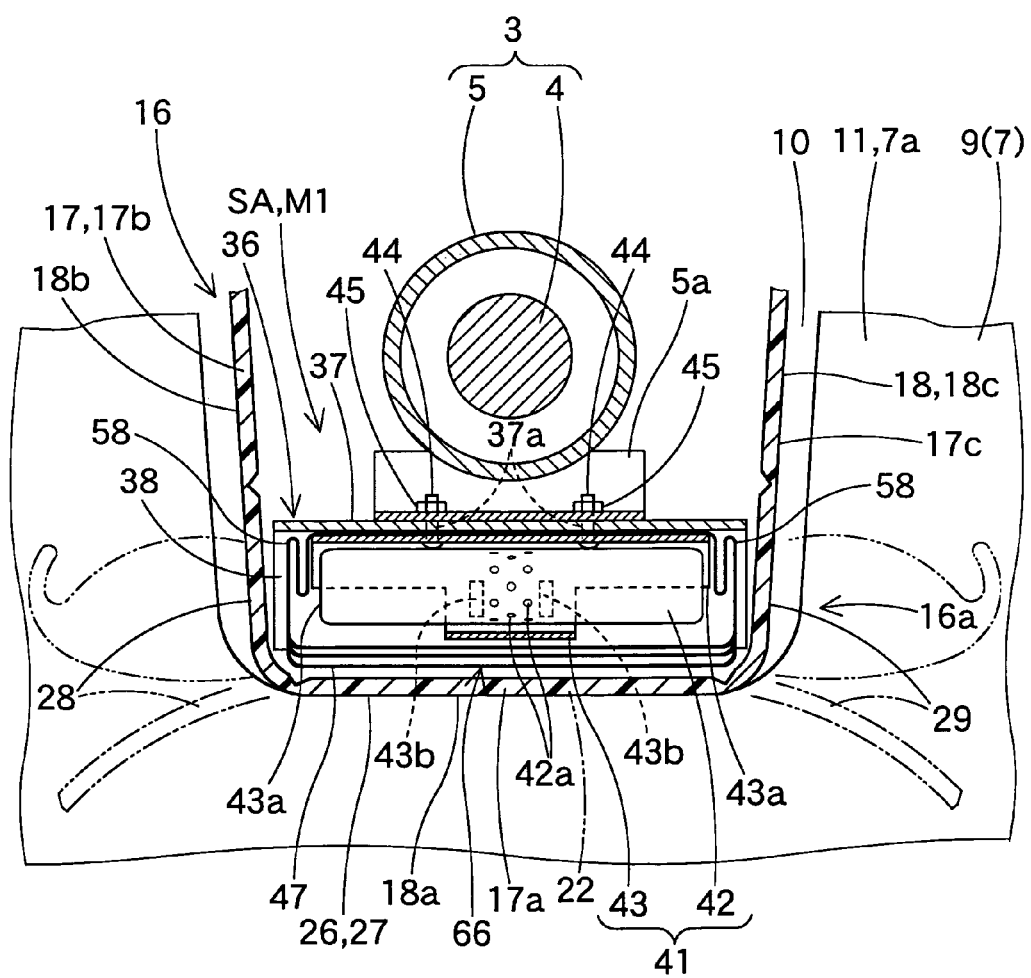
FIG. 4 is a schematic enlarged vertical section of the column cover of FIG. 1 equipped with the airbag apparatus taken along the lateral direction.

FIGS. 2-4 illustrate a knee-protecting airbag apparatus M1 embodying the invention. An airbag 47 of the airbag apparatus M1 is housed in a folded state at a lower region 16a of and inside a column cover 16. The airbag apparatus M1 includes the airbag 47, an inflator 41 for supplying inflation gas to the airbag 47, and a case or a housing 36 accommodating the airbag 47 and the inflator 41. The apparatus M1 is designed such that the airbag 47 pushes and opens a door 26 formed on the column cover 16 upon inflation to be deployed in front of knees K (KL and KR) of a driver D seated in a driver's seat, as shown in FIG. 14.

Unless otherwise specified, up/down, front/rear, and left/right directions in this description are intended to refer to up/down, front/rear, and left/right directions of a vehicle being steered straight ahead.

As shown in FIGS. 1-4, the column cover 16 is formed of synthetic resin into a generally square tubular contour and is mounted around the steering column 3 projecting rearward from an instrument panel or dashboard 7. The column cover 16 is attached to a column tube 5 of the steering column 3 at its unillustrated region and is disposed in front of a seated driver D in such a manner as to protrude diagonally rearward from an installation opening 10 formed on the dashboard 7 for installing the column cover 16, along the axial direction O1 (FIG. 2) of the steering column 3 with its front end located downward and its rear end upward. The steering column 3 includes a main shaft 4 and the column tube 5 mounted around the main shaft 4, and a steering wheel 1 is connected to the rear end of the main shaft 4. The dashboard 7 is comprised of an upper panel 8 disposed on upper side and a lower panel 9 disposed on lower side.

Figure 5A:
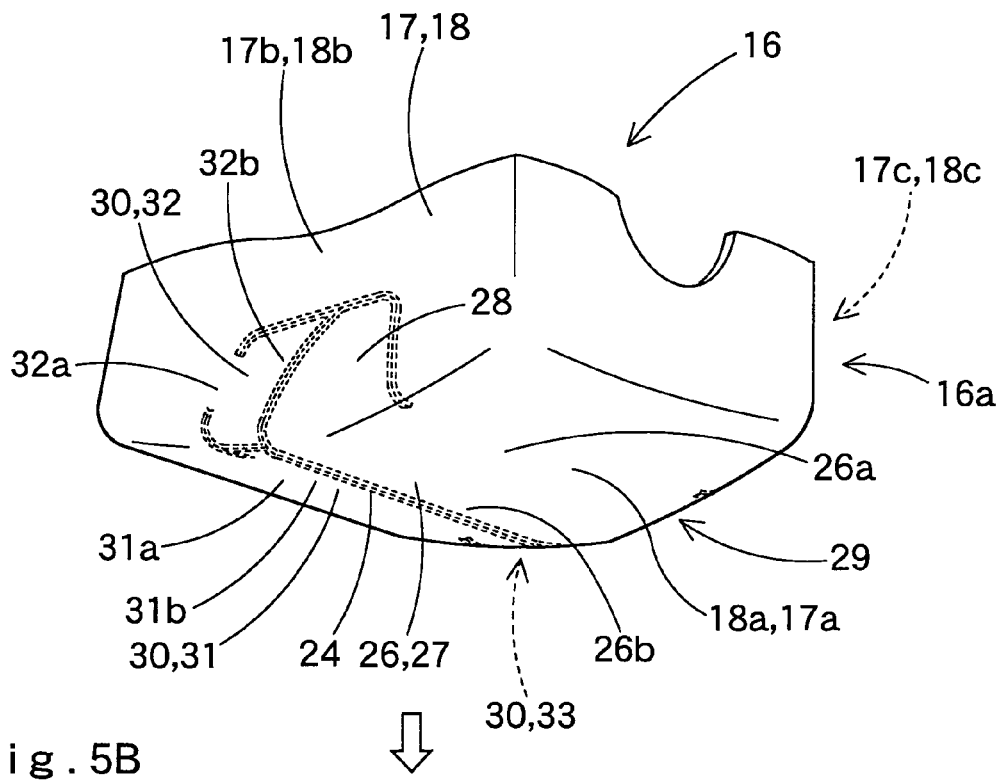
FIGS. 5A and 5B are perspective views of a door on the column cover before and after opening.
Figure 5B:
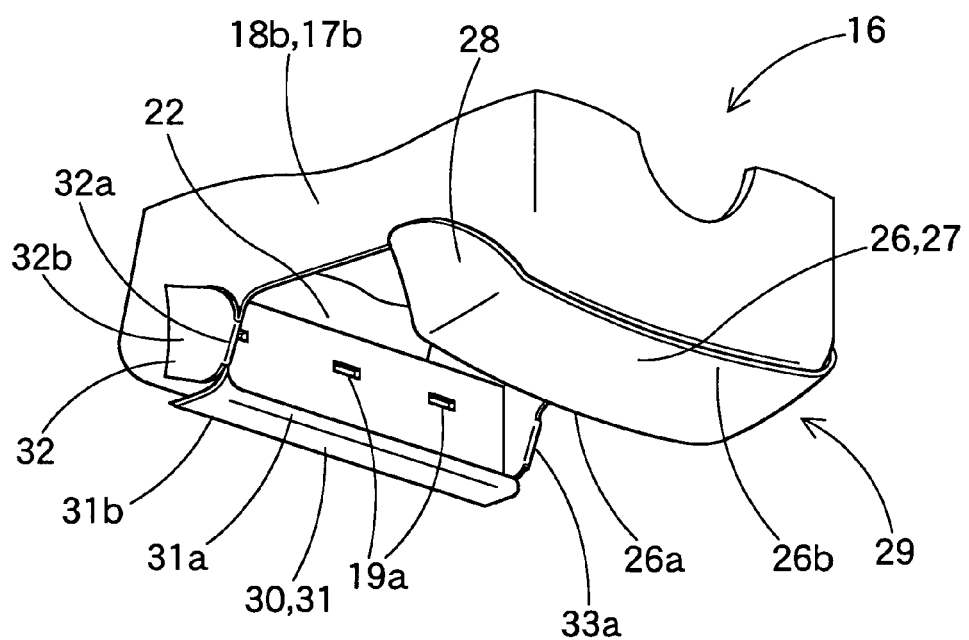
Figure 10:
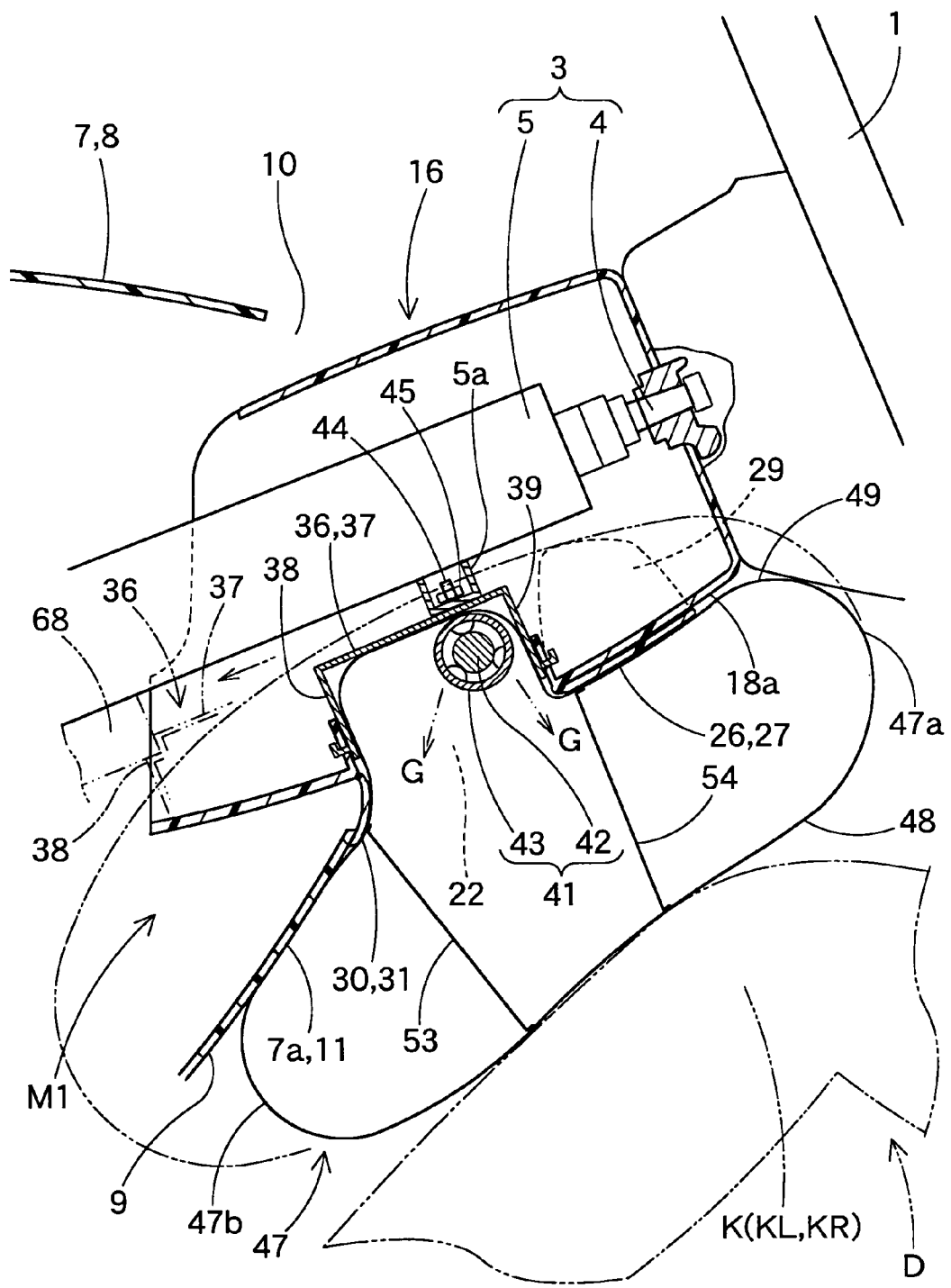
FIG. 10 is a schematic enlarged vertical section of the knee-protecting airbag apparatus of FIG. 1 in operation.
Figure 13A:
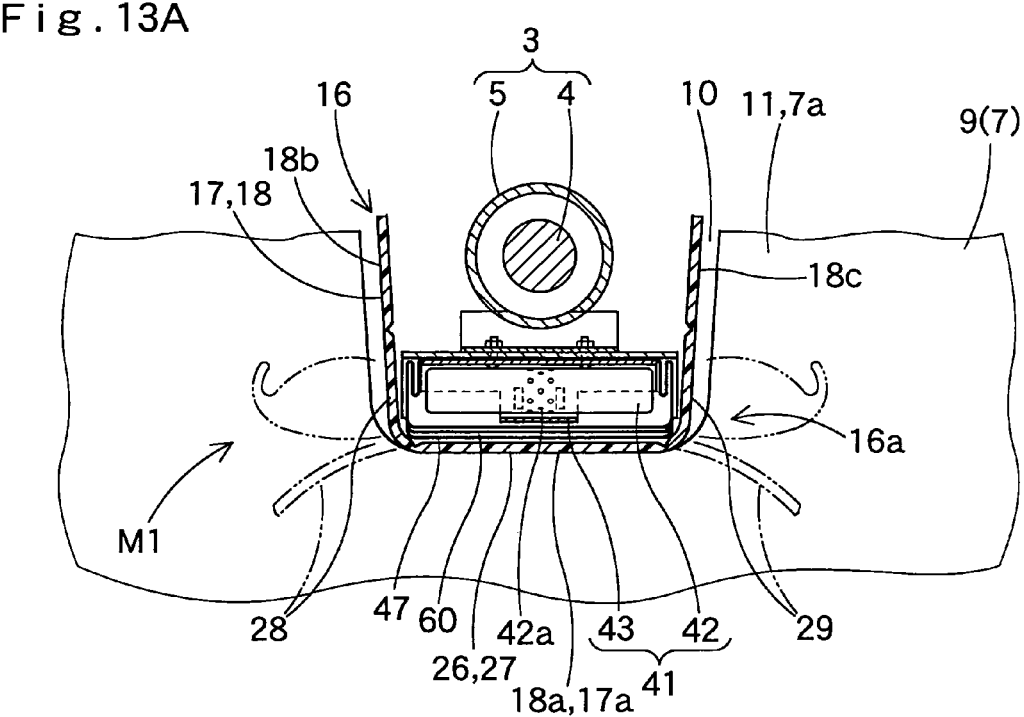
FIGS. 13A, 13B, 14A and 14B are schematic vertical sections of the airbag apparatus of FIG. 1 in operation taken along line XIII-XIII of FIG. 1 and presented in order.
Figure 13B:
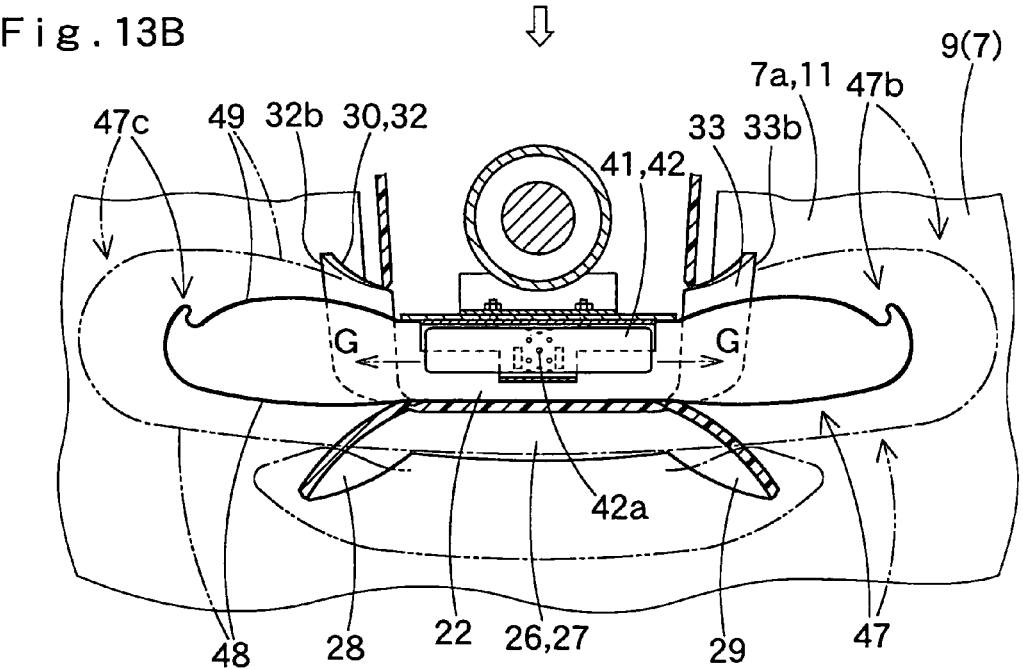

As shown in FIGS. 5, 10 and 13, the column cover 16 includes, in an area of its outer surface 18 ranging from a lower side 18a to left side 18b and right side 18c, a door 26 adapted to open when pushed by the airbag 47 to provide a single airbag emergence opening 22 allowing the airbag 47 to emerge therefrom. The door 26 is disposed rearward relative to the rear side 7a (FIG. 10) of the dashboard 7, and includes a lower section 27 located on the lower side 18a, a left section 28 located on the left side 18b, and a right section 29 located on the right side 18c, respectively of the column cover 16, and around the door 26 is a tearable portion 24 to be torn when pushed by the airbag 47. The tearable portion 24 is composed of a continuous linear groove formed on an inner surface of the column cover 16 so as to thin the thickness of the column cover 16.

The door 26 opens around a hinge portion 26a located at the rear edge of the lower section 27 and formed as an integral hinge such that the front edge 26b of the door 26 rotates rearward. At this time, as shown in FIGS. 5, 11, 12 and 13, the left section 28 and right section 29 open rearward along with the lower section 27 with their respective lower edges connected with the left and right edges of the lower section 27, and then are reversed to contact with the left side 18b and right side 18c of the column cover 16.

As shown in FIGS. 3, 5 and 14, the column cover 16 of this specific embodiment further includes an auxiliary door 30 adapted to open together with the door 26 when pushed by the airbag 47 for enlarging the area of the emergence opening 22. The auxiliary door 30 includes a lower door section 31 disposed on the lower side 18a, a left door section 32 on the left side 18b and a right door section 33 on the right side 18c, respectively of the column cover 16, and around each of them is a tearable portion 24. The lower door section 31, left door section 32, and right door section 33 of the auxiliary door 30 are adapted to open forward from respective rear edges 31b, 32b and 33b around hinge portions 31a, 32a and 33a disposed at respective front edges. The hinge portions 31a, 32a and 33a are integral hinges.

As shown in FIGS. 2 and 3, the column cover 16 internally includes side walls 19 and 20 formed along front and rear edges of an area defining the emergence opening 22 in such a manner as to extend upward from its bottom wall 17a. Left and right edges of the side walls 19 and 20 are connected with the left wall 17b and right wall 17c of the column cover 16. The side walls 19 and 20 serve to define a storage space S for accommodating the folded airbag 47 and the inflator 41 coupled with the case 36. The side walls 19 and 20 also act as mounting walls on which the case 36 is mounted. Specifically, each of the side walls 19 and 20 includes a plurality of slots 19a/20a for receiving and holding later-described retaining lugs 38a and 39a of the case 36.

The storage space S inside the column cover 16 for housing the airbag 47 and the inflator 41 is defined by the left section 28 and right section 29 of the door 26, the left door section 32 and right door section 33 of the auxiliary door 30, in the lateral direction, by later-described side walls 38 and 39 of the case 36 in the anteroposterior direction, by likewise later-described ceiling wall 37 of the case 36 on the top side, and by the lower section 27 of the door 26 and lower door section 31 of the auxiliary door 30 on the bottom.

As shown in FIGS. 2-4, the case 36 is made of sheet metal and has an inverted U-shaped section. The case 36 includes a ceiling wall 37 and side walls 38 and 39 extending downward from front and rear edges of the ceiling wall 37. Each of the side walls 38 and 39 is provided with a plurality of retaining lugs 38a/39a each having a J-shaped section. The retaining lugs 38a and 39a are put into the slots 19a and 20a of side walls 19 and 20 of the column cover 16 for joint with the side walls 19 and 20. The ceiling wall 37 is provided with a plurality of (two, in this embodiment) through holes 37a for receiving mounting bolts 44 of the inflator 41.

The case 36 acts as a housing area for accommodating and holding the inflator 41 and the airbag 47, and is secured to the column tube 5 of the steering column 3. In this embodiment, specifically, the case 36 is secured to a bracket 5a of the column tube 5 with mounting bolts 44 of the inflator 41 used to attach the airbag 47 to the case 36. In this embodiment, moreover, as best shown in FIG. 2, the two through holes 37a of the case 36, which line up in the lateral direction, are disposed to the rear side or rear direction of the ceiling wall 37 so that the inflator 41 is secured to a specific direction OD in the anteroposterior direction (i.e., to the rear side in this embodiment) on the case 36. That is, the specific direction OD, which will be called "the one-sided direction OD" below, is the rear side in this embodiment.

As shown in FIGS. 2-4, the inflator 41 includes a cylindrical body 42 provided with gas discharge ports 42a for discharging inflation gas and a retainer 43 made of sheet metal for holding the body 42 and attaching the airbag 47 to the case 36. The disposition of the inflator 41 is such that the axial direction O2 (FIG. 3) of the inflator body 42 extends along the lateral direction, and the discharge ports 42a are located at the lateral center of the body 42. The retainer 43 is formed into a generally cylinder whose axial direction extends along the lateral direction conforming to the axial direction O2 of the body 42 and includes a plurality of (two, in this embodiment) mounting bolts 44 disposed side by side in the lateral direction and extend upward. The mounting bolts 44 constitute means to mount the inflator body 42 to the case or housing 36. Left and right end regions of the retainer 43 are cut out on the lower side and thereby formed into half-piped shapes (dashed-lines in FIG. 4). These cur-out regions act as openings 43a for guiding the inflation gas discharged from the discharge ports 42a to the left and right. The retainer 43 is further provided at the vicinity of its lateral center with clamping portions 43b with reduced diameters for holding the inflator body 42 inserted into the retainer 43.

In addition to acting as the means to mount the inflator 41 to the case 36, the mounting bolts 44 of the retainer 43 attach the airbag 47 to the case 36 together with the inflator 41 and secure the case 36 to the bracket 5a of the column tube 5 of the steering column 3 by nuts 45. Although the mounting bolts 44 are formed on the retainer 43 in this embodiment, the bolts 44 may be formed on the inflator body 42 itself when not using a retainer 43.

As shown in FIGS. 6, 7, 12, and 14, the airbag 47 is formed into a generally rectangular plate shape elongative in the lateral direction at full inflation. The airbag 47 includes a driver side wall 48 to be deployed toward a driver D and a column side wall 49 to be deployed toward the column cover 16, respectively at full inflation. The driver side wall 48 and column side wall 49 are cut out from flexible woven fabric of polyester, polyamide or the like into generally identical rectangles elongative in the lateral direction, and then sewn up at outer peripheral edges to form a non three-dimensional airbag 47.

Figure 6:
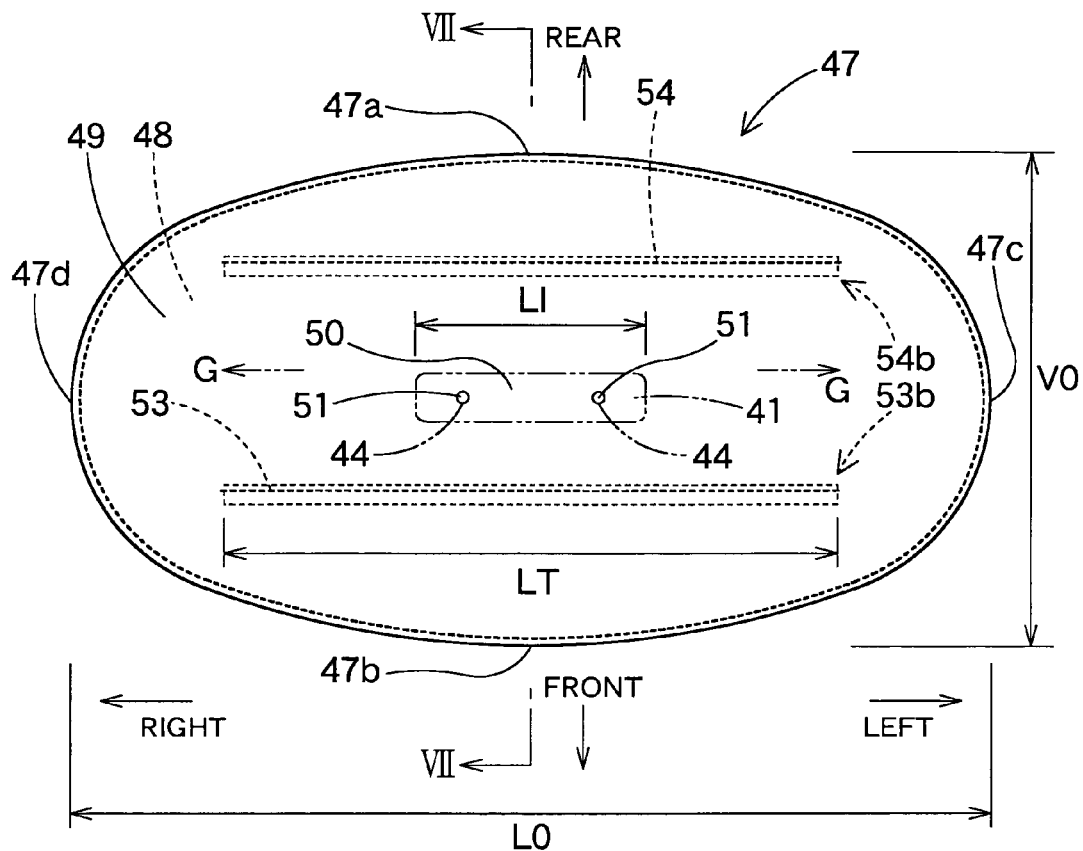
FIG. 6 is a plan view of an airbag of the first embodiment in a flattened state.

As shown in FIG. 6, the column side wall 49 is provided at the center of both lateral and anteroposterior directions with two apertures 51 disposed side by side along the lateral direction for receiving the mounting bolts 44 of the inflator 41. In this embodiment, the airbag 47 is firstly attached to the case 36 and then to the column tube 5 with the inflator 41, and therefore, a region of the airbag 47 around the apertures 51 and where the inflator 41 is arranged serves as a mounting region 50 that is clamped between the ceiling wall 37 of the case 36 and the retainer 43 of the inflator 41 at nut 45 fastening of the mounting bolts 44 and is secured to the case 36. That is, the mounting region 50 of the airbag 47 is a generally rectangular area elongative in the lateral direction according to the outer contour of the inflator 41 and disposed in the center of the column side wall 49 in both lateral and anteroposterior directions.

Figure 7:
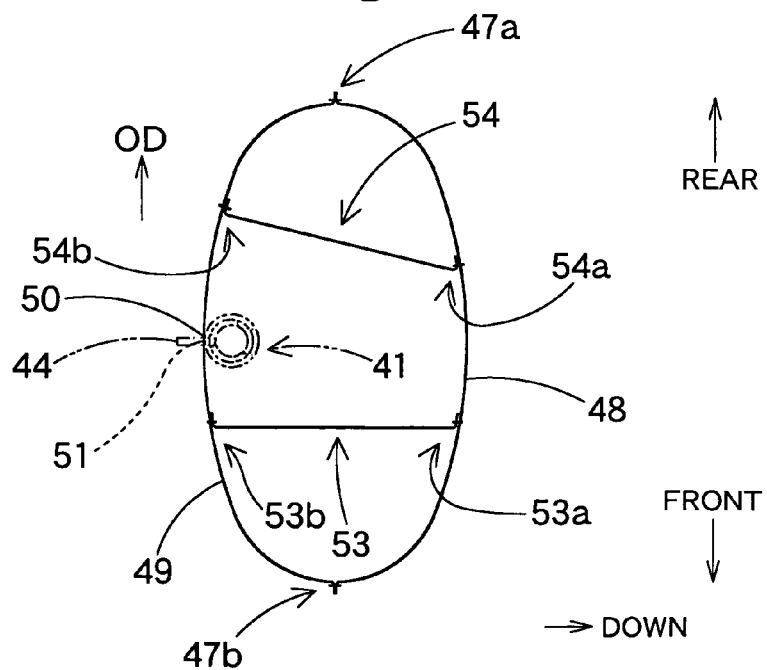
FIG. 7 is a sectional view of the airbag of FIG. 6 inflated by itself taken along VII-VII of FIG. 6.

As shown in FIG. 7, the airbag 47 is internally provided at both front and rear of the mounting region 50 with a front tether 53 and rear tether 54 both of which join the column side wall 49 and driver side wall 48 for regulating the thickness of the airbag at inflation and for redirecting inflation gas discharged from the inflator 41 to the left and right. The front tether 53 and rear tether 54 both have band shapes and are made of flexible woven fabric of polyester, polyamide or the like in a like manner to the driver side wall 48 and column side wall 49. A joint 53a of the front tether 53 and a joint 54a of the rear tether 54 to the driver side wall 48 are located at such positions as to trisect the anteroposterior width V0 of the driver side wall 48 generally equally. Joints 53b and 54b to the column side wall 49 are disposed with a greater distance so as to accommodate the inflator 41 therebetween easily. In this specific embodiment, the joint 54b of the rear tether 54 is disposed to the rear edge 47a of the airbag 47.

The airbag 47 at full inflation has such an anteroposterior width as to cover the lower side 18a of the column cover 16 projecting rearward from the dashboard 7 and a rear side 7a of a region of the dashboard 7 below and in the periphery of the installation opening 10 (FIGS. 12 and 14) to protect knees KL and KR of the driver D. In this embodiment, the lateral width L0 of the airbag 47 in the flattened state is 600 mm, which is about twice the anteriposterior width V0 (FIG. 6). The lateral width LI of the inflator 41 is about 150 mm, and the lateral widths LT of the front tether 53 and rear tether 54 are about 400 mm.

Although the airbag 47 of this embodiment is composed of two separate walls 48 and 49, there are options for construction of the airbag 47. For example, the airbag 47 may be formed by doubling up a single cloth member where the driver side wall 48 and the column side wall 49 are connected at a part of respective peripheral edge, and sewing up a remainder of the peripheral edges.

To mount the knee-protecting airbag apparatus M1 on the vehicle, firstly, the airbag 47 is folded up. In this embodiment, the airbag 47 flattened with the column side wall 49 and driver side wall 48 superimposed one on the other is folded up to fit into the case 36 through steps of initial folding, bending, lateral contraction and anteroposterior contraction as shown in FIGS. 8A, 8B, 8C, 9A, 9B, 9C and 9D. The inflator 41 is housed inside the airbag 47 before the folding so the mounting bolts 44 project from the airbag 47. The airbag 47 is subjected to the sewing work on the outer peripheral edges of the driver side wall 48 and column side wall 49 after the placement of the inflator 41 inside the airbag 47.

Figure 8A:
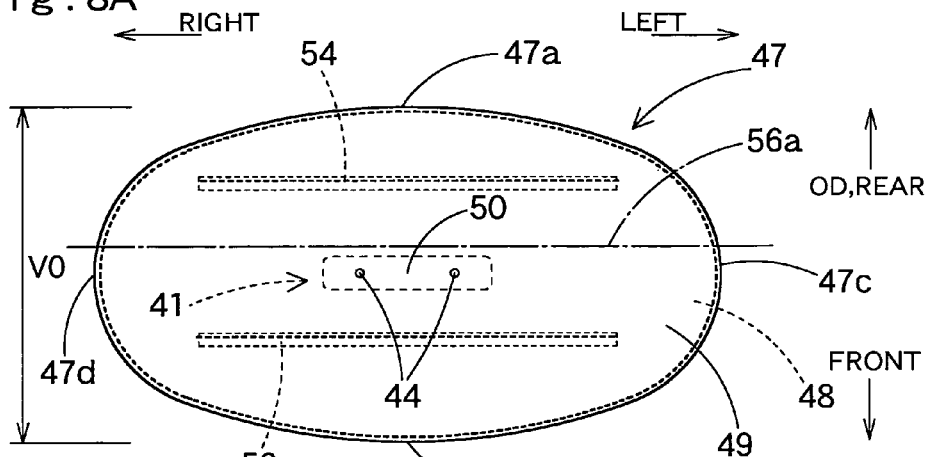
Figure 8B:
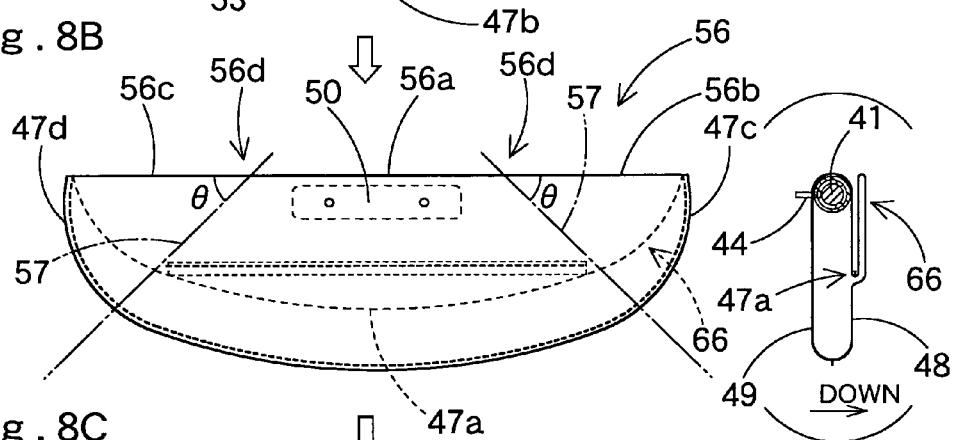

The initial folding is a step to locate an area of the flattened airbag 47 to the one-sided direction OD relative to the mounting region 50 on an area in the opposite direction from the one-sided direction OD relative to the mounting region 50 including the mounting region 50 so as to reduce the anteroposterior width V0 of the airbag 47. That is, as shown in FIGS. 8A and 8B, the area of the airbag 47 to the one-sided direction OD relative to the mounting region 50 i.e. the area proximate the rear edge 47a is brought close to the mounting region 50, thereby forming an initially-folded airbag 56. In this specific embodiment, the rear area of the airbag 47 is folded inward of the airbag 47 to be disposed below the mounting region 50 (see the parenthesized drawing of FIG. 8B).

Figure 8C:
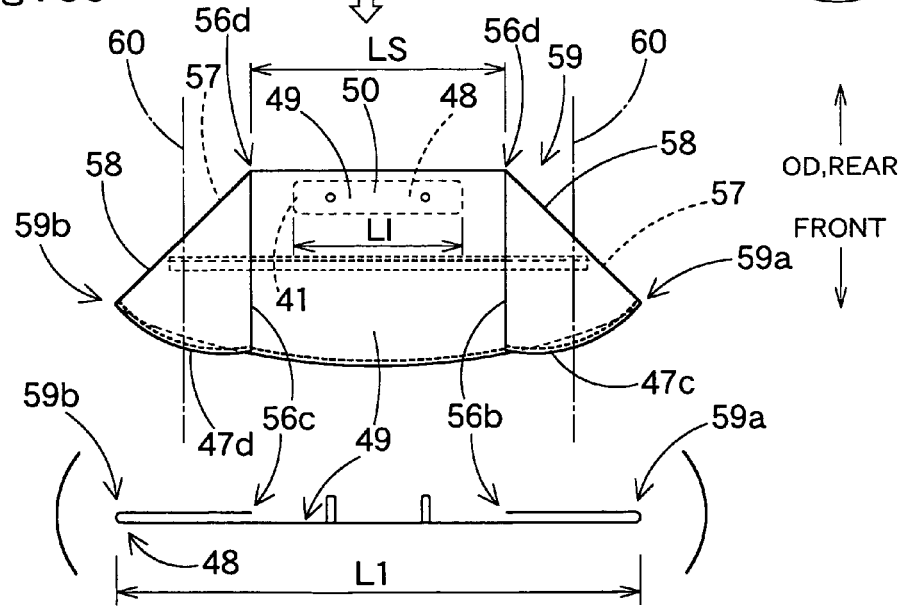

The bending is a step to locate portions of the airbag 47 on the left and right of the mounting region 50 on an area opposite from the one-sided direction OD relative to the mounting region 50. Specifically, as shown in FIGS. 8B and 8C, a left edge 47c and right edge 47d of the initially-folded airbag 56 are folded back toward the opposite direction to the one-sided direction OD on creases 57 that extend toward the left and right and toward the opposite direction from the one-sided direction OD in an expanding manner from left and right vicinities 56d of the mounting region 50 on a rear edge 56a of the initially-folded airbag 56, which rear edge 56a is the edge of the airbag 47 subjected to the initial folding on the part of the one-sided direction OD. As a result, a rear left part 56b and rear right part 56c of the rear edge 56a disposed on the left and right of the mounting region 50 are located on extensions from the left and right peripheries of the mounting region 50 to the opposite direction from the one-sided direction OD without superimposing the parts 56b and 56c on the mounting region 50 in the vertical direction. The airbag 47 in this state will be called a bent airbag 59. The angles θ of the creases 57 from the rear edge 56a and the distance LS between the creases 57 are designed so that ridge lines 58 (FIG. 8C) formed on outer sides of the creases 57 may not overlap with the inflator 41 in the vertical direction upon conducting the lateral contraction.

The lateral contraction is a step to fold the bent airbag 59 but below the inflator 41 so that the airbag 47 has the lateral width L2 capable of fitting into the case 36. Referring to FIGS. 8C, 9A and 9B, specifically, left edge 59a and right edge 59b of the bent airbag 59 are folded toward the column side wall 49 so they come close to the lateral center so that the lateral width L1 of the bent airbag 59 is contracted to the width L2 fittable into the case 36, thereby forming a laterally-contracted airbag 62. In this embodiment, as shown in FIG. 9A, the left edge 59a and right edge 59b of the bent airbag 59 are folded over the column side wall 49 on creases 60 so that the left edge 59a and right edge 59b are brought close to the rear left edge 56b and rear right edge 56c of the initially-folded airbag 56. Subsequently, left edge 59c and right edge 59d of the airbag thus folded are further folded over the column side wall 49 on creases 61 that are formed in the vicinities of the rear left edge 56b and rear right edge 56c of the initially-folded airbag 56 so that the left edge 59c and right edge 59d are located on the central region in the lateral direction as shown in FIG. 9B. That is, the bent airbag 59 is folded twice in total on the column side wall 49 in a rolling fashion.

In this specific embodiment, the lateral width L2 of the laterally-contracted airbag 62 is configured slightly greater than the lateral width LI of the inflator 41 or the mounting region 50.

The anteroposterior contraction is a step to reduce the anteroposterior width of the laterally-contracted airbag 62 by rolling to the width V1 capable of fitting in the case 36. Specifically, referring to FIGS. 9B, 9C and 9D, the front edge 62a of the laterally-contracted airbag 62, which is the edge of the airbag on the opposite direction from the one-sided direction OD, is brought close to the mounting region 50 by rolling on the side of the column side wall 49 so that the rolled region 63 is disposed in parallel with the inflator 41 in the anteroposterior direction. Thus a folded-up body 64 is formed, and the folding of the airbag 47 is completed.

The folded-up airbag 47 is wrapped by an unillustrated wrapping member for keeping the folded-up configuration. Then the airbag 47 and the inflator 41 are stored between the side walls 38 and 39 of the case 36 below the ceiling wall 37 by inserting the mounting bolts 44 of the inflator 41 through the through holes 37a of the ceiling wall 37, and the bolts 44 are fastened with unillustrated spring nuts, thereby forming an airbag module SA composed of the case 36, the airbag 47 and the inflator 41.

The airbag module SA thus assembled is secured to the bracket 5a of the column tube 5 of the steering column 3 by fastening the mounting bolts 44 with nuts 45, and then a not-shown lead wire extending from an airbag activating circuit is connected to the inflator body 42. Then the column cover 16 is attached to the steering column 3 while fitting the retaining lugs 38a and 39a of the case 36 into the slots 19a and 20a of the side walls 19 and 20 of the column cover 16, and thus the knee-protecting airbag apparatus M1 is mounted on the vehicle.

In the knee-protecting airbag apparatus M1 of the present invention, as shown in FIG. 8C, the bending disposes the majority of areas of the airbag 47 except an overlapped area 66 shown in FIG. 8B, i.e. areas of the column side wall 49 and driver side wall 48 that range from the mounting region 50 to the rear edge 47a (or the edge on the one-sided direction OD) and over the lateral width LI of the mounting region 50 and overlap with the inflator 41, to the front side, i.e., to the opposite side from the one-sided direction OD relative to the mounting region 50. The areas disposed to the front side is then subjected to the lateral contraction as shown in FIGS. 9A and 9B to the lateral width L2 to fit in the case 36, and further subjected to the anteroposterior contraction to the anteroposterior width V1 to fit in the case 36 as shown in FIG. 9D.

With this way of folding, it is a folded region formed at the initial folding, i.e., the overlapped area 66 described above that overlaps with the inflator 41 in the direction orthogonal to the axial direction of the steering column 3, i.e., below the inflator 41. Accordingly, the thickness of the inflator 41 and the region 66 of the airbag 47 overlapping with the inflator 41 is reduced. The remaining areas of the airbag 47 except the overlapped area 66 are all located to the front side of the inflator 41, i.e. to the opposite side from the one-sided direction OD in the anteroposterior direction extending along the axial direction O1 of the steering column 3, as the rolled region 63 formed in the anteroposterior contraction and disposed in parallel with the inflator 41 that is arranged laterally. Therefore, the folded-up airbag 47 is compact in the anteroposterior width V1 and thickness T (FIG. 2). Although the lateral width L2 is slightly greater than the lateral width LI of the mounting region 50 and the inflator 41, it is compact, too, because it is generally same with the width LI.

Consequently, the anteroposterior width V1, the lateral width L2, and the thickness (or vertical dimension) T of the folded-up airbag 47 and the inflator 41 are compact, thereby downsizing the case 36 as well.

The area 66 overlapping with the inflator 41 below the inflator 41 is a small area of the column side wall 49 and driver side wall 48 that range from the mounting region 50 to the edge of the airbag 47 on the one-sided direction OD (i.e., the rear edge 47a) and over the lateral width LI of the mounting region 50. Accordingly, when the airbag 47 is fed with inflation gas G discharged from the inflator 41, the overlapped area 66 projects less downward toward a driver D since the area 66 is small.

Therefore, the knee-protecting airbag apparatus M1 of the invention inhibits the projection of the airbag 47 toward a driver D at deployment, and is compact in size.

When the airbag apparatus M1 is activated, inflation gas G is discharged from the gas discharge ports 42a of the inflator body 42, and is supplied to the airbag 47 via the openings 43a on the left and right of the retainer 43. Then the airbag 47 fed with inflation gas G pushes and opens the door 26 and the auxiliary door 30 and unfolds and inflates from the opened emergence opening 22 in a generally inverse fashion to the folding steps. That is, the region 63 of the airbag 47 subjected to the anteroposterior contraction unfolds firstly. Since the area 63 is rolled and the rolling requires more time to unroll or unfold in comparison with other folding methods like bellows-folding, it unrolls accompanied by unfolding of the creases 61 and 60 formed in the lateral contraction. That is, before completion of unrolling of the rolled region 63, the airbag 47 expands to the left and right quickly by unfolding of the folds of the lateral contraction as shown in FIGS. 11A, 11B, 12A, 13A, 13B and 14A, and even apart of the area subjected to the bending unfolds toward the left and right.

Figure 12A:
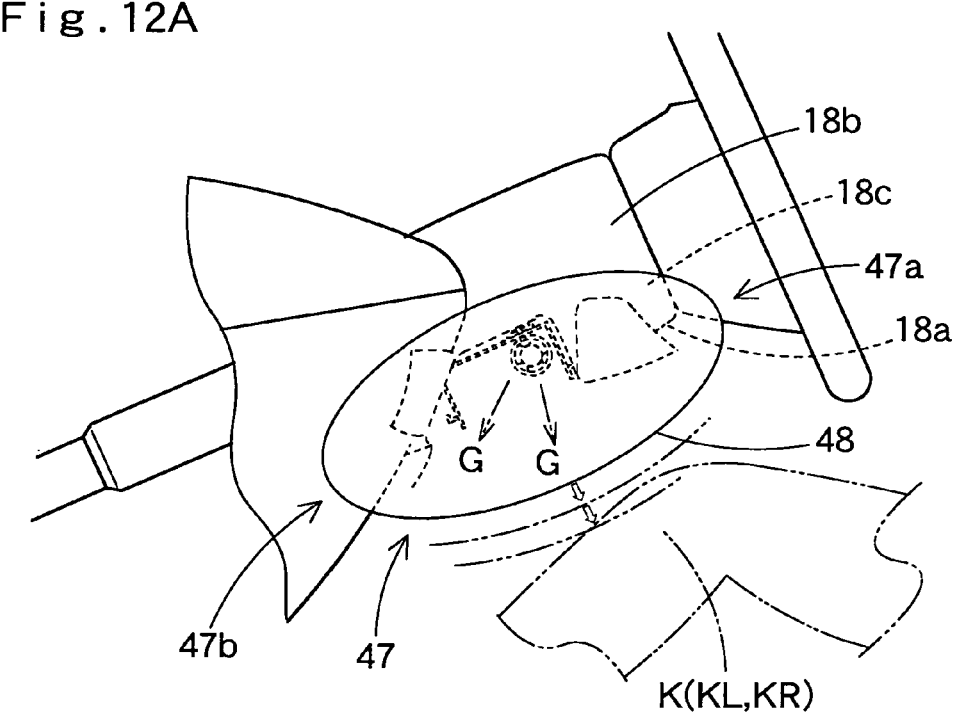
Figure 12B:
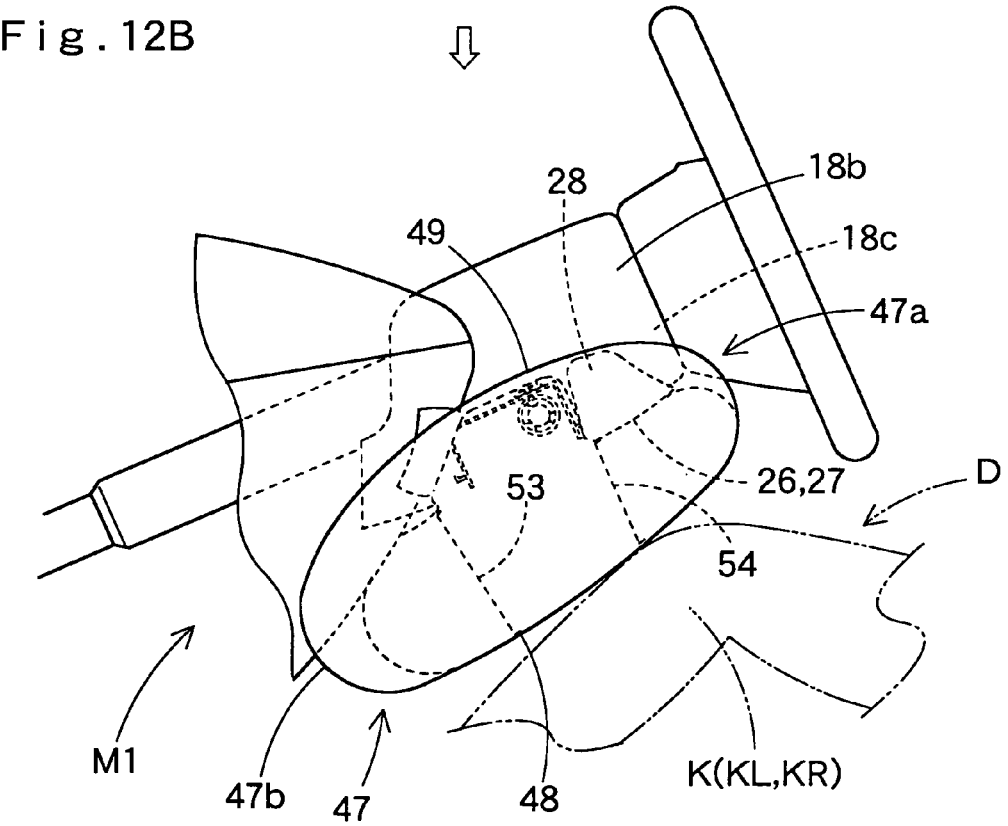
Figure 14A:
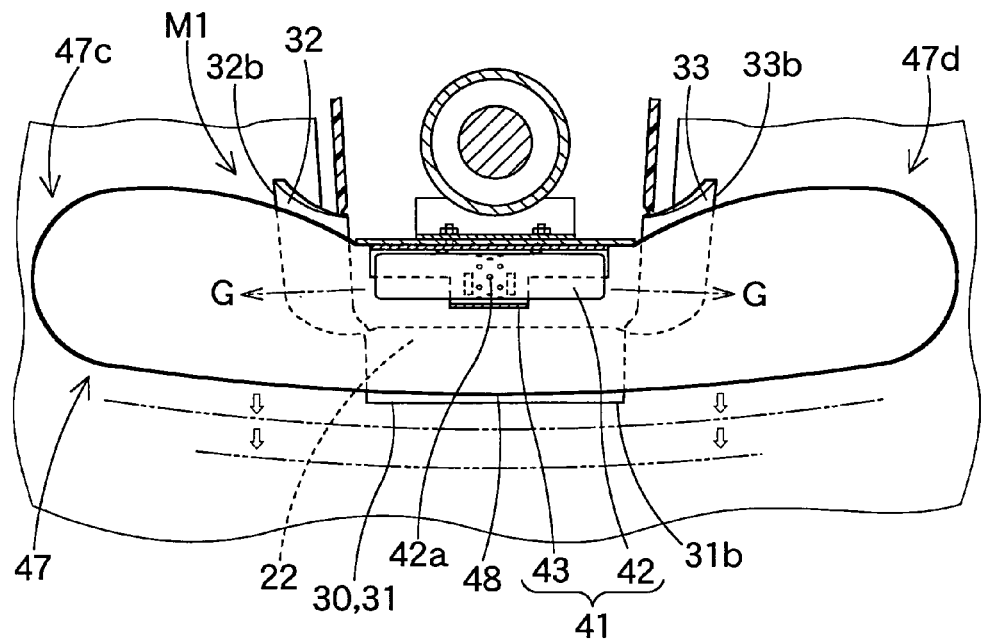

Then as shown in FIGS. 12A and 14A, the airbag 47 is fully expanded toward the left and right and the area to the front edge 47a (i.e., the area on the opposite side from the one-sided direction OD) is fully unrolled. The folds formed in the bending is unfolded as well and the area 66 on the side of the one-sided direction OD relative to the mounting region 50 is unfolded toward the one-sided direction OD, and then the whole airbag 47 inflates to the full as shown in FIGS. 10, 12B and 14B.

Since both the lateral contraction which fold the majority of areas of the airbag 47 and the anteroposterior contraction are conducted on the side of the column sidewall 49, the unfolding toward the left and right and unrolling toward the opposite direction to the one-sided direction OD proceed without projection toward the driver D, thereby accelerating the unfolding toward the left and right.

Figure 14B:
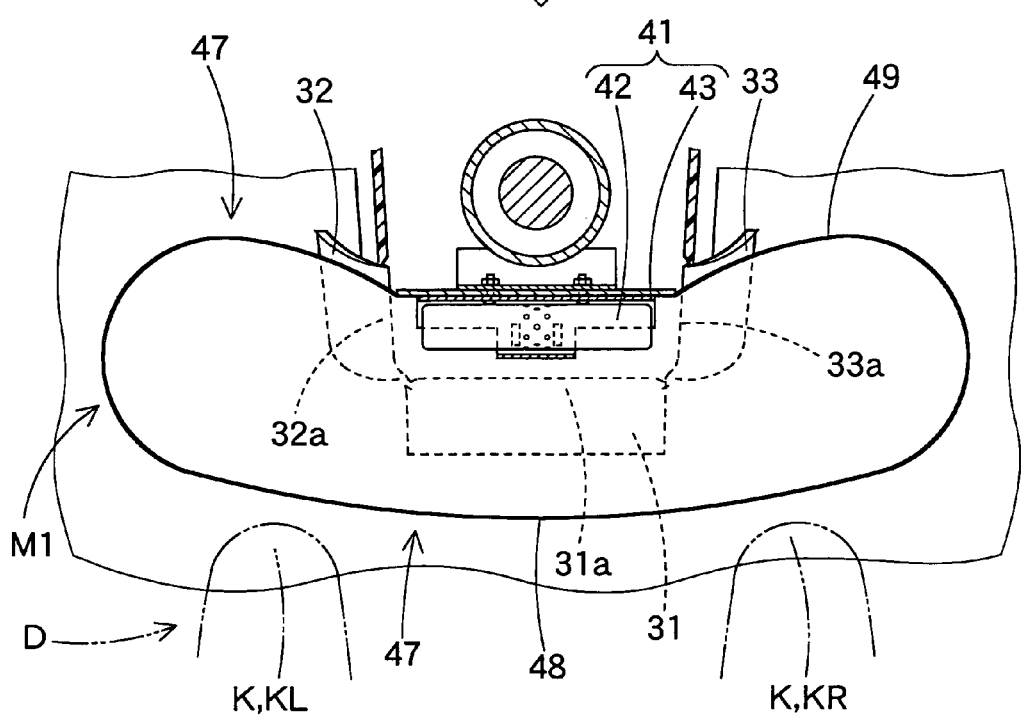

That is, as shown in FIGS. 14A and 14B, the airbag 47 inflates and thickens after being fully developed toward the left and right without projecting toward the driver D. Accordingly, the airbag 47 is preferably used for the knee-protecting airbag apparatus M1 mounted on the steering column proximate the driver D.

Therefore, the knee-protecting airbag apparatus M1 is compact in size while assuring smooth deployment performance of the airbag 47 toward four directions. Moreover, although the apparatus M1 is mounted on the column cover 16 proximate the driver D, it deploys the airbag 47 over a region ranging from the lower side of the column cover 16 to the rear surface 7a of the dashboard 7 on the left and right of the column cover 16 in such a sufficiently thickened state as to exert cushioning property.

Figure 11A:
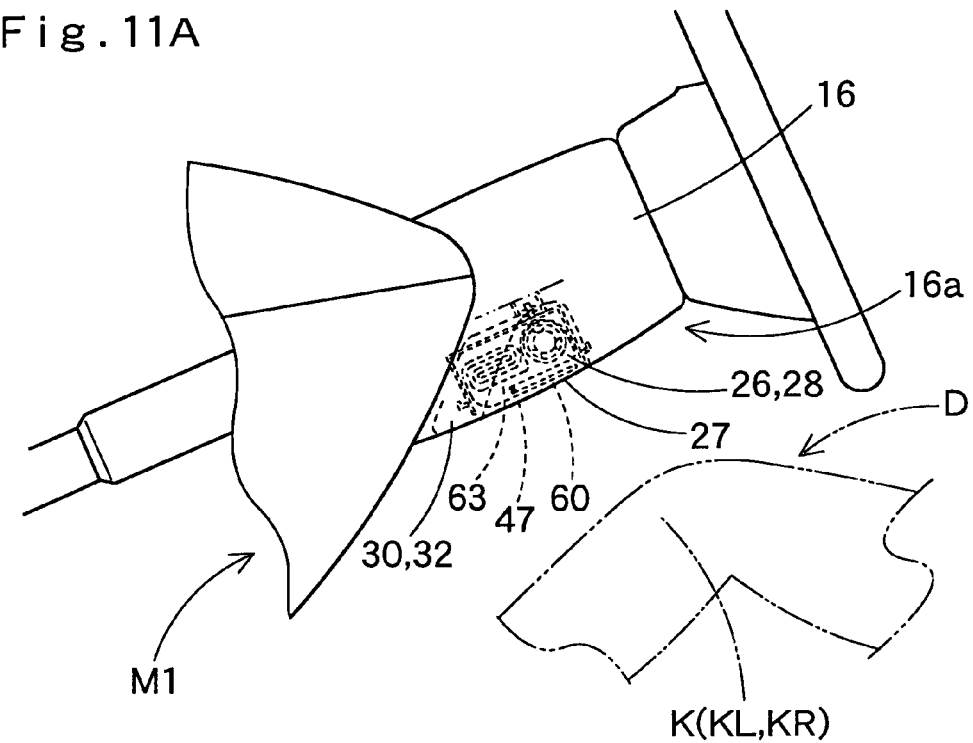
FIGS. 11A, 11B, 12A and 12B are side views of the airbag apparatus of FIG. 1 in operation presented in order.
Figure 11B:
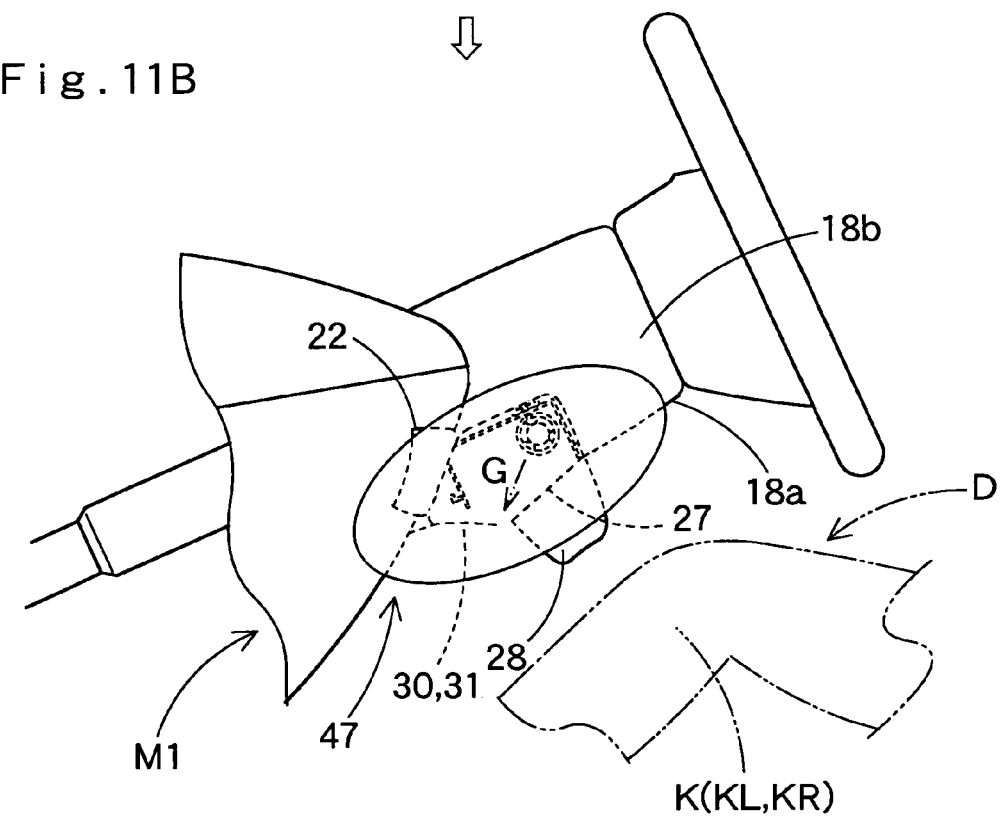

In the foregoing embodiment, the one-sided direction OD to which the inflator 41 is disposed inside the case 36 is the rear side. That is, the inflator 41 is disposed to the rear side of the case 36 whereas the rolled region 63 of the airbag 47 is to the front side of the case 36 (FIGS. 2 and 11A). This configuration will be advantageous in such an instance where the steering column 3 is configured axially shrinkable for absorbing impact energy by moving the case 36 disposed proximate the steering wheel 1 forward. Specifically, if the case 36 is moved forward as indicated by double-dashed lines in FIG. 10 so the steering column 3 absorbs the impact energy and the case 36 engages such fixed members 68 located on an immovable area of the steering column 3 as a telescopic mechanism or tilt mechanism, such members 68 will engage only the side wall 38 of the case 36 that has launched the airbag 47 and are more plastically deformable than the inflator 41, not a rigid inflator 41, which will result in the plastic deformation of the side wall 38, not inhibiting the impact energy absorption of the steering column 3.

Figure 15:
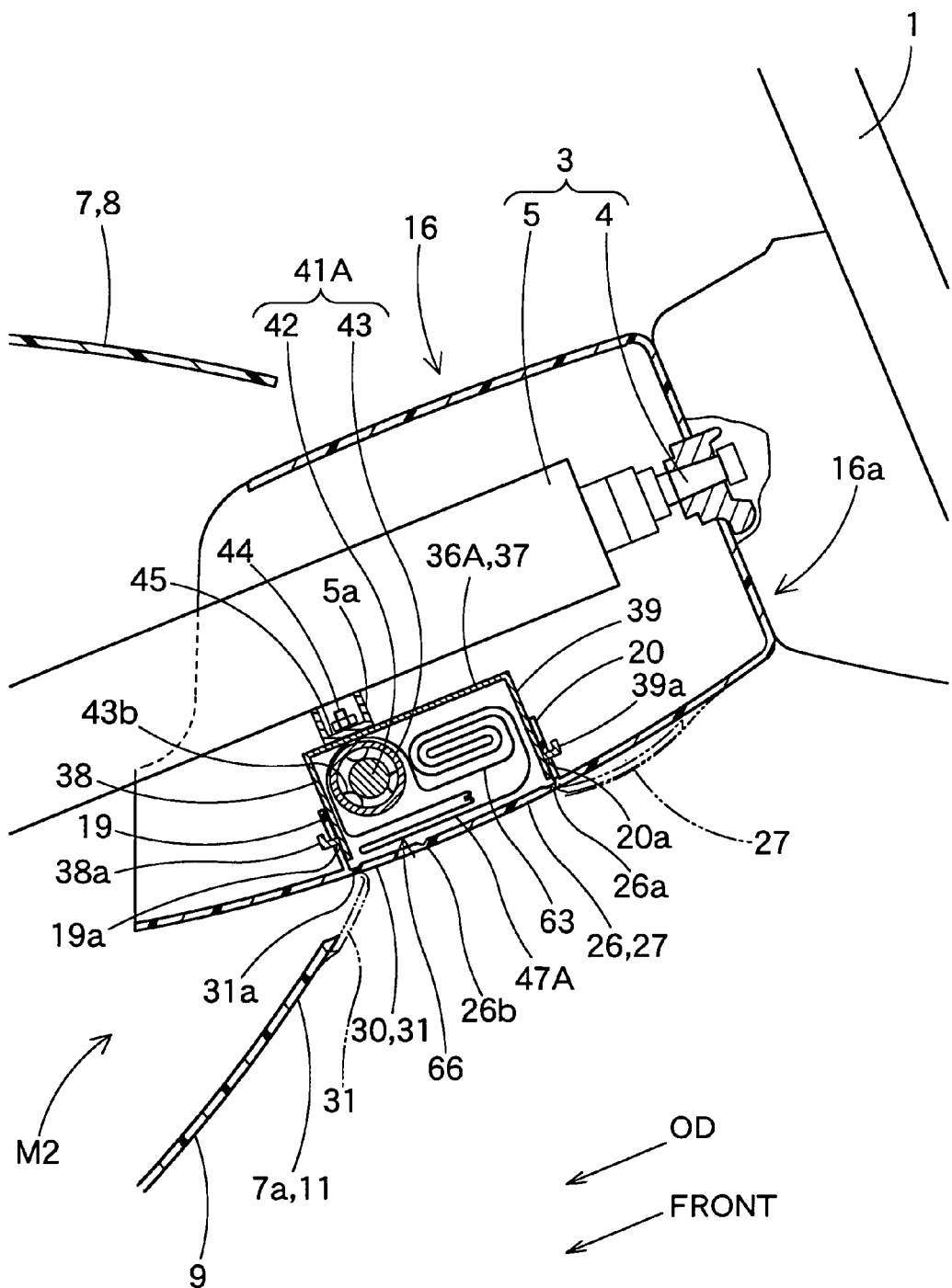
FIG. 15 is a schematic enlarged vertical section of an alternative embodiment of the airbag apparatus of the invention.

If the above advantages do not have to be considered, dispositions of the case and inflator may be reversed as in a following alternative embodiment shown in FIGS. 15-17. In a knee-protecting airbag apparatus M2 illustrated in these drawings, an inflator 41A is disposed to the front side inside a case 36A while a rolled region 63 of an airbag 47A is to the rear side of the inflator 41A. The airbag 47A in this embodiment has an identical structure to the airbag 47 of the foregoing embodiment and is subjected to the anteroposteriorly symmetric folding to that of the airbag 47.

Figure 16A:
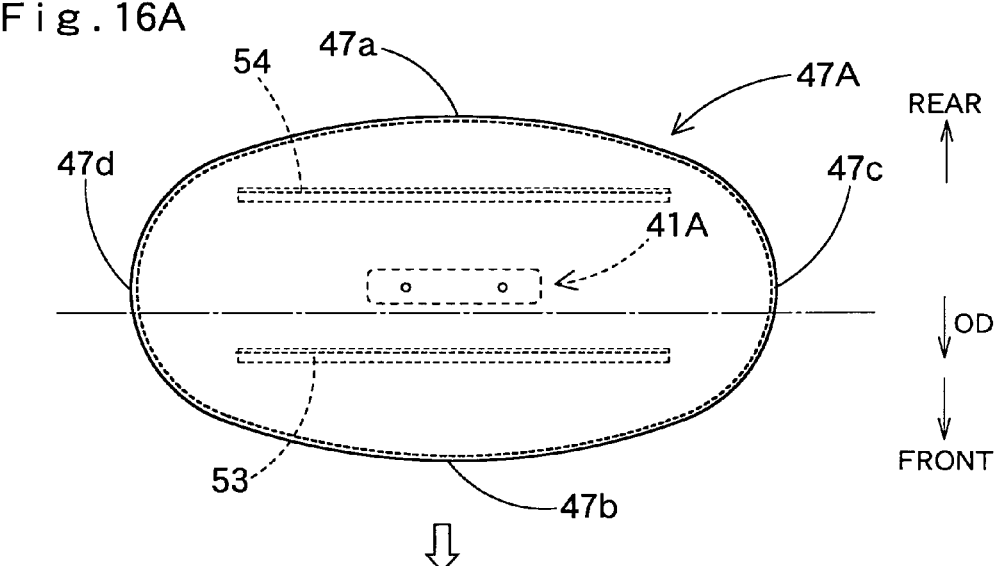
FIGS. 16A, 16B, 16C, 17A, 17B, 17C and 17D illustrate the folding process of an airbag for the airbag apparatus of FIG. 15 in order.
Figure 16B:
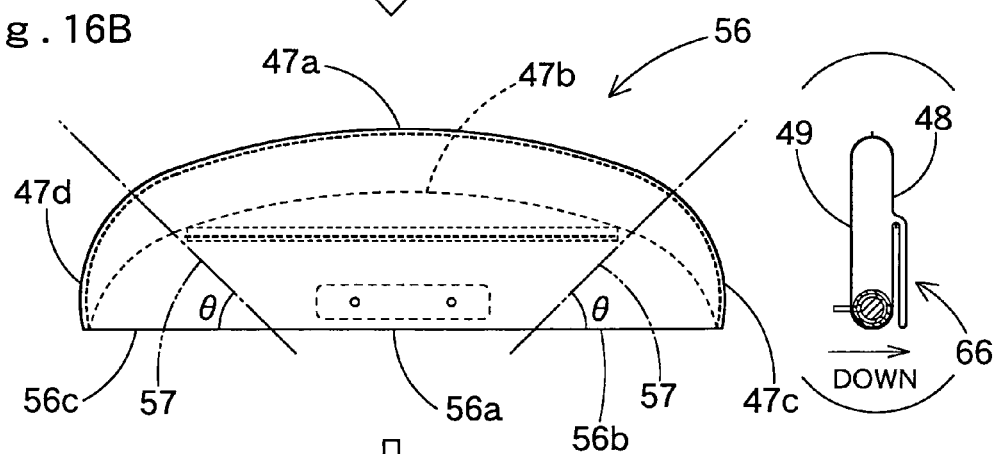

To describe the folding of the airbag 47A, the initial folding is so conducted as to locate an area of the flattened airbag 47A to the one-sided direction OD relative to the mounting region 50 on an area to the opposite direction from the one-sided direction OD relative to the mounting region 50 including the mounting region 50 so as to reduce the anteroposterior width V0 of the airbag 47A. Specifically, as shown in FIGS. 16A and 16B, the area of the airbag 47A to the one-sided direction OD relative to the mounting region 50 i.e. the area proximate the front edge 47b is brought close to the mounting region 50, thereby forming an initially-folded airbag 56A. In this specific embodiment, the front area of the airbag 47A is folded inward of the airbag 47A to be disposed below the mounting region 50 (see the parenthesized drawing of FIG. 16B).

The bending is so conducted as to locate a front left part 56f and front right part 56g of the front edge 56e (the edge of the initially-folded airbag 56A in the one-sided direction OD) disposed on the left and right of the mounting region 50 on extensions from the left and right peripheries of the mounting region 50 to the opposite direction from the one-sided direction OD without superimposing the parts 56f and 56g on the mounting region 50 in the vertical direction (FIGS. 16B and 16C) so that portions of the airbag 47A on the left and right of the mounting region 50 are located on an area opposite from the one-sided direction OD relative to the mounting region 50. Specifically, a left edge 47c and right edge 47d of the initially-folded airbag 56A are folded back toward the opposite direction to the one-sided direction OD on creases 57 that extend toward the opposite direction from the one-sided direction OD in an expanding manner from left and right vicinities 56h of the mounting region 50 on the front edge 56e of the initially-folded airbag 56A, thereby forming a bent airbag 59A.

Figure 16C:
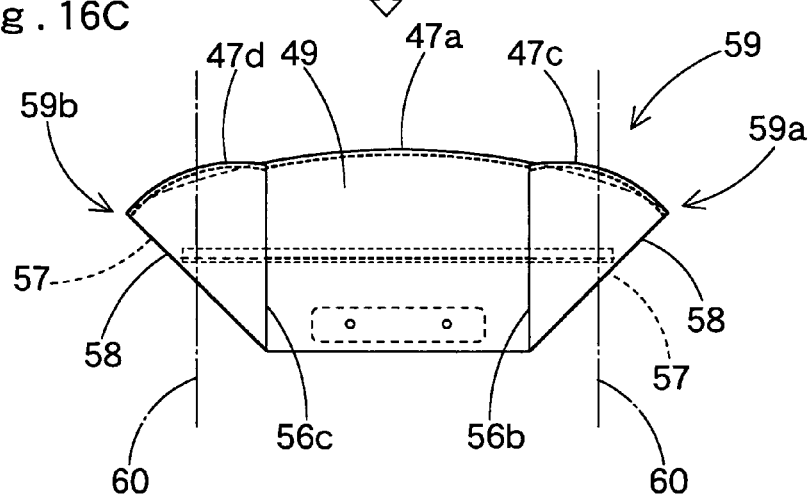
Figure 17A:
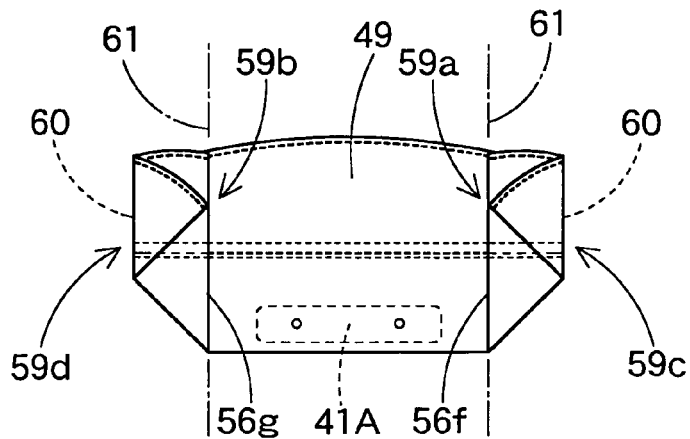
Figure 17B:
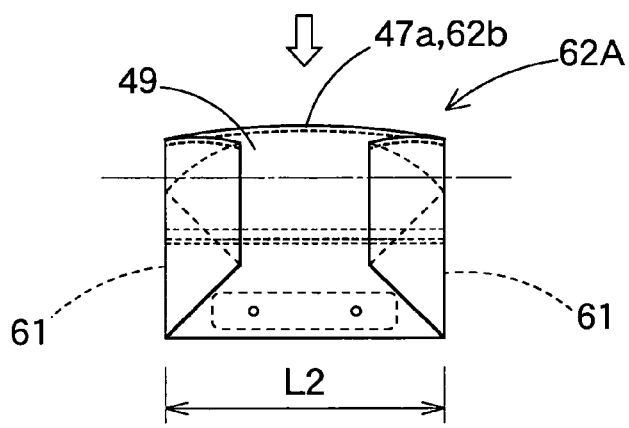
Figure 17C:
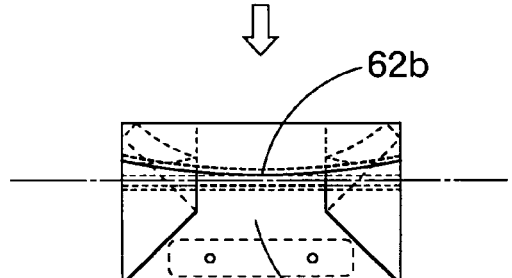
Figure 17D:
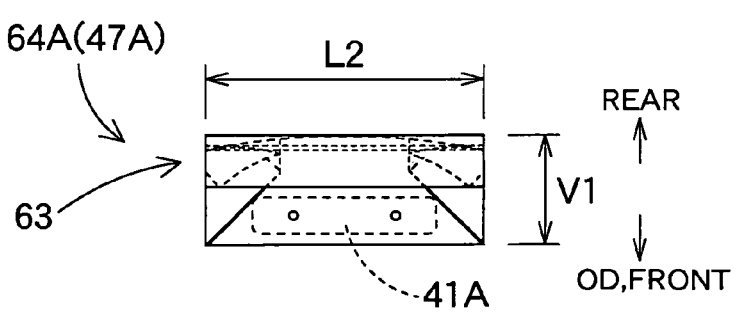

Referring to FIGS. 16C, 17A and 17B, in the lateral contraction, left edge 59a and right edge 59b of the bent airbag 59A are folded on the side of the column side wall 49 so they come close to the lateral center so that the lateral width L1 of the bent airbag 59A is contracted to the width L2 fittable into the case 36A, thereby forming a laterally-contracted airbag 62A. In the illustrated embodiment, as shown in FIG. 17A, the left edge 59a and right edge 59b of the bent airbag 59A are folded over the column side wall 49 on creases 60 so that the left edge 59a and right edge 59b are brought close to the front left edge 56f and front right edge 56g of the initially-folded airbag 56A. Subsequently, left edge 59c and right edge 59d of the airbag thus folded are further folded toward each other over the column side wall 49 on creases 61 that are formed in the vicinities of the front left edge 56f and front right edge 56g of the initially-folded airbag 56A so that the left edge 59c and right edge 59d are located on the central region in the lateral direction as shown in FIG. 17B. That is, the bent airbag 59A is folded twice in total on the side of the column side wall 49 in a rolling fashion.

In the anteroposterior contraction, the laterally-contracted airbag 62A is rolled and contracted in the anteroposterior direction to the width V1 capable of fitting in the case 36A. Specifically, referring to FIGS. 17B, 17C and 17D, the rear edge 62b of the laterally-contracted airbag 62A, which is the edge of the airbag on the opposite direction from the one-sided direction OD, is brought close to the mounting region 50 by rolling on the side of the column side wall 49 so that the rolled region 63 is disposed in parallel with the inflator 41A in the anteroposterior direction. Thus a folded-up body 64A is formed.

Back to the airbag apparatus M1, the airbag 47 of the apparatus M1 is provided at front and rear of the mounting region 50 with the front tether 53 and rear tether 54 each having a band shape and joining the column side wall 49 and driver side wall 48 for regulating the thickness of the airbag 47 at inflation and for redirecting inflation gas G discharged from the inflator 41 to the left and right. Upon deployment of the airbag 47, the tethers 53 and 54 help accelerate the unfolding of the airbag 47 toward the left and right before the airbag 47 increases in thickness, and therefore, the airbag 47 is preferably used for the knee-protecting airbag apparatus M1 mounted on the steering column proximate the driver D.

In the anteroposterior contraction of the foregoing embodiment, the front edge 62a of the laterally-contracted airbag 62 on the opposite side from the one-sided direction OD is rolled toward the mounting region 50 on the side of the column side wall 49 before being disposed in parallel with the inflator 41 as the rolled region 63. However, the area of the laterally-contracted airbag 62 on the opposite side from the one-sided direction OD may be rolled on the side of the driver side wall 48. It will also be appreciated to fold the area of the laterally-contracted airbag 62 on the opposite side from the one-sided direction OD in a bellows or accordion fashion and locate thus folded region in parallel with the inflator 41. However, roll-folding will be desirable for the anteroposterior contraction when considering the unfolding of the airbag 47 toward the left and right, and roll-folding on the side of the column side wall 49 will be further desirable when considering the inhibition of projection of the airbag 47 toward a driver D.

Moreover, although the lateral contraction of the foregoing embodiments is comprised of roll-folding, it may also be conducted by folding the left and right edge areas 59a and 59b of the bent airbag 59 in a bellows fashion on the side of the column side wall 49 to reduce the lateral width L1 of the bent airbag 59 to the width L2 fittable in the case 36. Furthermore, it may be conducted by folding the left and right edge areas 59a and 59b of the bent airbag 59 by rolling or in a bellows fashion on the side of driver side wall 48. However, it will be desirable to fold the left and right edge areas 59a and 59b of the bent airbag 59 on the side of the column side wall 49 by roll-folding or bellows-folding because that way the projection of the airbag 47 toward a driver D at unfolding will be inhibited.

In the bending step of the foregoing embodiments, moreover, the left edge 47c and right edge 47d of the initially-folded airbag 56 are folded over the column side wall 49 toward the opposite direction to the one-sided direction OD. However, the bending may be conducted on the side of the driver side wall 48. The bending on the side of the column side wall 49 like in the foregoing embodiments is nevertheless desirable since that way will inhibit the projection of the airbag 47 toward a driver D at unfolding of the airbag 47.

Although the rear edge 47a (the edge in the one-sided direction OD) is folded inward of the airbag 47 in the step of initial folding, the rear edge area 47a may be folded over the driver side wall 48. However, it will be desirable to fold the rear edge area 47a inward of the airbag 47 in order to inhibit the projection of the airbag 47 toward a driver D. It will be unacceptable to fold the area on the one-sided direction OD relative to the mounting region 50 on the side of the column side wall 49 because that way the area is likely to be clamped between the mounting region 50 and the case 36 and thereby inhibiting unfolding of the initial folding upon airbag deployment.

The invention claimed is:

1. A knee-protecting airbag apparatus adapted to be mounted on a lower region of a column cover that covers a steering column of vehicle projecting rearward from an instrument panel, the airbag apparatus comprising:

an airbag folded up by a folding method specified below and housed in a housing on a lower area inside the column cover and emerging from the column cover and spreading in four directions from the housing for deployment in front of knees of a driver when fed with inflation gas, the airbag being a non-three-dimensional airbag comprised of a column side wall and a driver side wall having identical generally rectangular outer contours elongative in the lateral direction and adapted to inflate into a generally rectangular plate shape elongative in the lateral direction, and the airbag including a mounting region on a center in the lateral and anteroposterior directions of the column side wall, at which mounting region the airbag is attached to the housing; and an inflator stored inside the airbag for supplying inflation gas to the airbag and attaching the airbag to the housing, the inflator including a cylindrical body provided with gas discharge ports for discharging the inflation gas and arranged such that an axial direction thereof extends along the lateral direction; and a means to mount the body and the airbag on the housing at the location of the mounting region of the airbag, the inflator being disposed to either one direction in the anteroposterior direction inside the housing, one direction to which the inflator is disposed inside the housing is a one-sided direction, said folding method of the airbag comprising:

an initial folding that folds an area of the flattened airbag to the one-sided direction relative to the mounting region so that the area overlaps and is proximate the mounting region, whereby reducing the anteroposterior width of the airbag;

a bending that bends left and right peripheral areas of the airbag subjected to the initial folding toward an opposite direction from the one-sided direction on creases that extend toward the opposite direction from the one-sided direction in an expanding manner from left and right vicinities of the mounting region in an edge of the airbag subjected to the initial folding in the one-sided direction such that left and right parts of the edge of the airbag subjected to the initial folding in the one-sided direction which are disposed on the left and right of the mounting region are located on extensions from the left and right of the mounting region to the opposite direction from the one-sided direction without overlapping the left and right peripheral areas of the airbag subjected to the initial folding with the mounting region in the vertical direction;

a lateral contraction that folds and brings left and right ends of the airbag subjected to the bending close to the lateral center of the airbag but below or above the inflator so that the airbag is contracted in the lateral direction to fit into the housing; and an anteroposterior contraction that folds and brings an edge of the airbag subjected to the lateral contraction on the opposite side from the one-sided direction close to the mounting region and locate a folded region thus formed in parallel with the inflator so that the airbag is contracted in the anteroposterior direction to fit into the housing.

2. The knee-protecting airbag apparatus according to claim 1, wherein the anteroposterior contraction is comprised of rolling of a region of the airbag subjected to the lateral contraction including the edge on the opposite side from the one-sided direction toward the mounting region and locating the region thus rolled in parallel with the inflator.

3. The knee-protecting airbag apparatus according to claim 2, wherein the rolling is conducted on the side of the column side wall.

4. The knee-protecting airbag apparatus according to claim 1, wherein the folding of the left and right ends of the airbag subjected to the bending in the lateral contraction is conducted on the side of the column side wall.

5. The knee-protecting airbag apparatus according to claim 1, wherein the bending of the left and right peripheral areas of the airbag subjected to the initial folding toward the opposite direction from the one-sided direction is conducted on the side of the column side wall.

6. The knee-protecting airbag apparatus according to claim 1, wherein the initial folding is comprised of folding of the area of the airbag to the one-sided direction relative to the mounting region inward of the airbag.

7. The knee-protecting airbag apparatus according to claim 1, wherein the one-sided direction to which the inflator is disposed inside the housing is the rear side.

8. The knee-protecting airbag apparatus according to claim 1, wherein the airbag includes at front and rear of the mounting region a front tether and a rear tether each having a band shape and joining the column side wall and driver side wall for regulating the thickness of the airbag at inflation and for redirecting inflation gas discharged from the inflator to the left and right.

9. The knee-protecting airbag apparatus according to claim 8, wherein a distance between joints of the front tether and rear tether to the column side wall is greater than a distance between joints of the front tether and rear tether to the driver side wall.

* * * * *